(12) United States Patent
Dainty et al.

(10) Patent No.: US 8,456,632 B2
(45) Date of Patent: Jun. 4, 2013

(54) VECTORIAL POLARIMETRY METHOD AND APPARATUS FOR ANALYZING THE THREE-DIMENSIONAL ELECTROMAGNETIC FIELD RESULTING FROM AN INTERACTION BETWEEN A FOCUSED ILLUMINATING FIELD AND A SAMPLE TO BE OBSERVED

(76) Inventors: John Christopher Dainty, Galway (IE); Oscar Gabriel Rodriguez, Galway (IE); David Lara Saucedo, London (GB)

( * ) Notice: Subject to any disclaimer, the term of this patent is extended or adjusted under 35 U.S.C. 154(b) by 415 days.

(21) Appl. No.: 12/598,583

(22) PCT Filed: Apr. 28, 2008

(86) PCT No.: PCT/EP2008/055191
§ 371 (c)(1),
(2), (4) Date: Nov. 2, 2009

(87) PCT Pub. No.: WO2008/135438
PCT Pub. Date: Nov. 13, 2008

(65) Prior Publication Data
US 2010/0128268 A1 May 27, 2010

(30) Foreign Application Priority Data
May 2, 2007 (EP) .................................. 07107376

(51) Int. Cl.
*G01J 4/00* (2006.01)
(52) U.S. Cl.
USPC ......................................... 356/364; 356/367

(58) Field of Classification Search
USPC .................................................. 356/364–370
See application file for complete search history.

(56) References Cited

U.S. PATENT DOCUMENTS
7,115,858 B1 * 10/2006 Holden et al. ................. 250/225

OTHER PUBLICATIONS

Lara, D et al. "Axially Resolved Complete Mueller Matrix Confocal Microscopy," Applied Optics (2006) vol. 45, No. 9: 1917-1930.
Lara D et al. "Double-pass Axially Resolved Confocal Mueller Matrix Imaging Polarimetry," Optics Letters (2005) vol. 30, No. 21: 2879-2881.

* cited by examiner

*Primary Examiner* — Tara S Pajoohi Gomez
(74) *Attorney, Agent, or Firm* — Lewis Kohn & Fitzwilliam LLP; David M. Kohn; Kari Moyer-Henry

(57) ABSTRACT

A method and apparatus for analysing the three-dimensional electromagnetic field resulting from an interaction between a focused illuminating beam and a sample to be observed, by characterising the distribution of the state of polarization of light across a measurement plane, the method comprising the steps of generating a beam of illuminating light; controlling the state of polarization at different positions across the beam width of the light beam; focussing said illuminating light beam to a focus, wherein said focus is a tight focus and said focused light has a suitable three-dimensional vectorial structure at the focus; detecting and measuring the state of polarization of the reflected light at different positions across the width of the measurement plane to retrieve information on the three-dimensional vectorial electromagnetic interaction of the illuminated focused field and the sample.

30 Claims, 21 Drawing Sheets

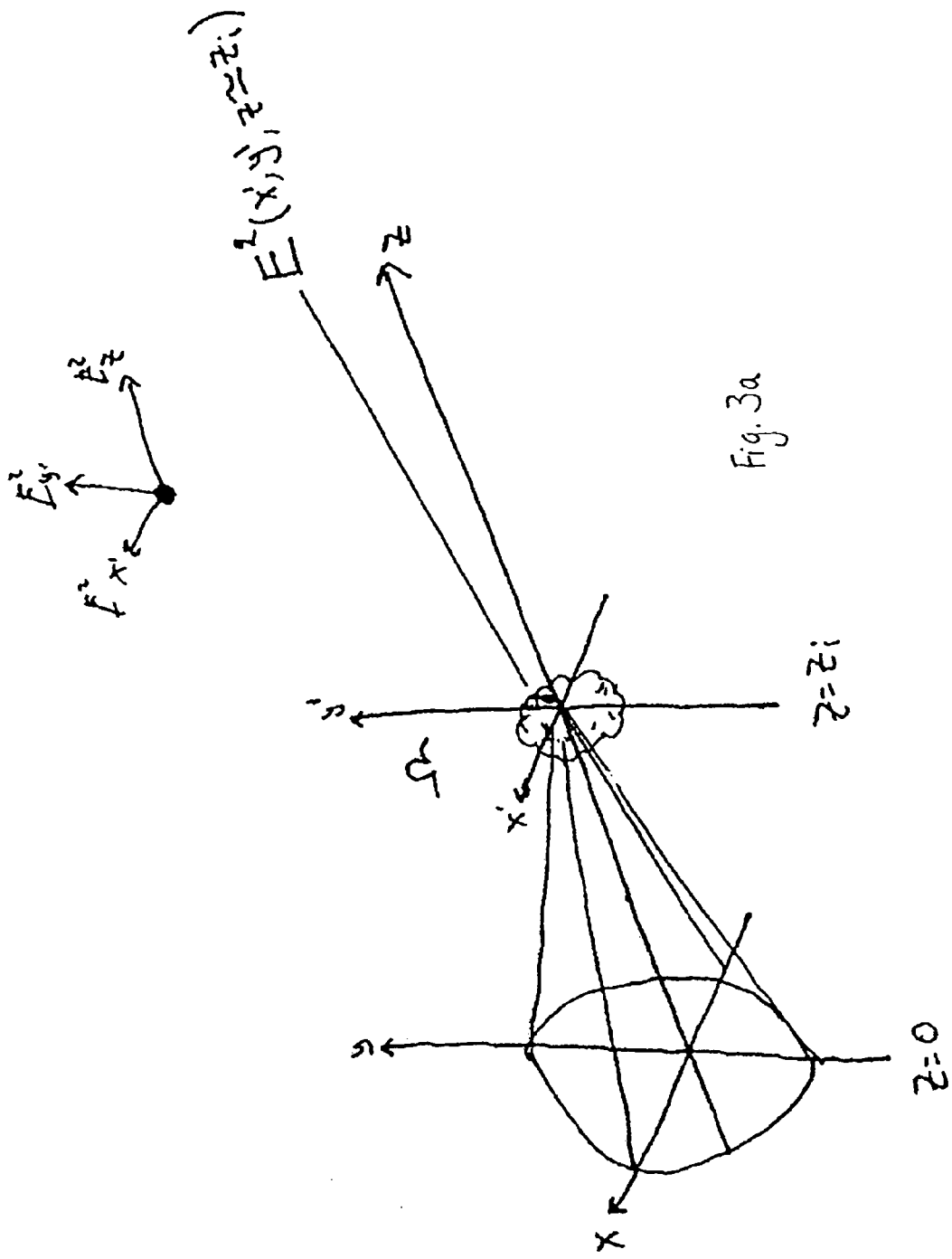

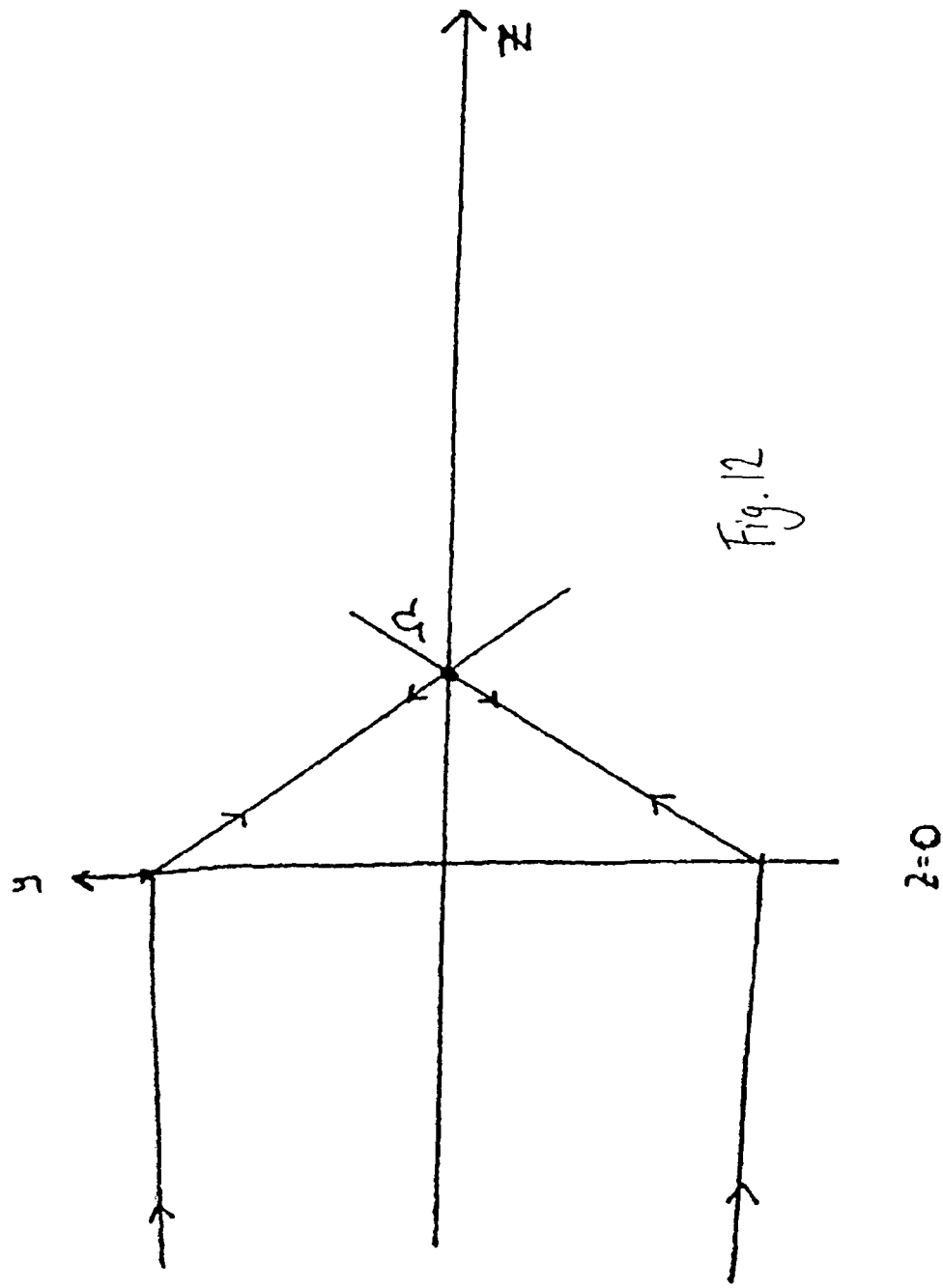

VECTORIAL POLARIMETRY METHOD AND APPARATUS FOR ANALYZING THE THREE-DIMENSIONAL ELECTROMAGNETIC FIELD RESULTING FROM AN INTERACTION BETWEEN A FOCUSED ILLUMINATING FIELD AND A SAMPLE TO BE OBSERVED

FIELD OF THE INVENTION

The present invention relates to vectorial polarimetry. In particular the invention relates to a vectorial polarimetry method with applications on microscopy, metrology, molecular imaging, and optical data storage.

BACKGROUND TO THE INVENTION

A beam of electromagnetic (EM) radiation can be represented as a vectorial field that propagates along a given direction, which will be denoted by Z in this document. FIG. 1 is a schematic representation of a beam of light being focused by an optical system Σ in the region Ω. FIG. 1 shows a typical beam-like field $E^0(x,y,z)$ that propagates along the positive direction Z. A more explicit representation of the field would require a temporal variable, $E^0(x,y,z,t)$, that can indicate possible changes in time of the field; for example induced modulations by mechanical or opto-electronic means. The subject of this invention is applicable to time-varying electromagnetic fields as well. For simplicity, in the rest of the document, the possible temporal variation of the fields will be assumed as implicit, and the temporal variable will not be included in the text. If a beam of light propagates through an isotropic medium, its EM vector field, at every position within the beam, lies on a plane (X-Y) that is perpendicular to the direction of propagation. In other words, for a beam-like field there is no component of the EM field along the direction of propagation Z; or there is no longitudinal component of the EM field. In FIG. 1, $E^0(x,y,z)$ is the representation of an example of such a beam-like field.

When light is brought to a focus by an optical system (e.g. Σ at z=0 in FIG. 1, wherein Σ can be any optical system that focuses the beam, e.g. a combination of refracting and/or reflecting surfaces, a diffraction grating, etc.) with a sufficiently large numerical aperture (N.A.), the EM field ($E^1(x', y',z)$) that is formed in the region Ω around the focus no longer necessarily lies on a single plane perpendicular to the direction of propagation of the original beam. Near the focal region Ω the general EM field possesses a longitudinal component, $E^1_z(x', y', z)$, which is parallel to the direction of propagation of the original beam, as well as transverse components, $E^1_{x'}(x', y', z)$ and $E^1_{y'}(x', y', z)$, parallel to the plane X'-Y'. Note that the primed coordinates x' and y' are the same as x and y. The primed coordinate system around the focal region was chosen to emphasize the difference between the beam-like field and the focused field. The total longitudinal component of the focused field depends on the state of polarisation of the original beam, or more accurately, on the distribution of the state of polarisation across a transverse section of the original beam; in FIG. 1, for example, the field distribution $E^0(x, y, z=0)$ at z=0. This became well known since the publication of a seminal paper in 1959 by Richards and Wolf where they analysed a focused field in an aplanatic system, and is also true as long as the N.A. is sufficiently large, even if the system is not aplanatic; for example in the presence of optical aberrations, or dielectric interfaces. The vectorial structure of the EM field in the focal region of a high N.A. focusing system has been studied for several years now; its most common intended applications reside in the areas of optical storage, microscopy and scanning optical microscopy, photonic force microscopy, lithography, laser microfabrication, particle guiding or trapping, and single molecule imaging. The influence of the spatial distribution of the state of polarisation of the beam before it is strongly focused on the focused EM field has also been explored vastly. Perhaps one of the most common distributions is that of cylindrical vector beams, which include radial polarisation and azimuthal polarisation, but infinite number of other possibilities exist. Different polarisation distributions can be attained by using, for example, discrete polarisation elements like a pixelated spatial light modulator, continuous polarisation devices like the newly reported space-variant waveplate, or by simple phase and amplitude masks. Cylindrical vector fields can produce spots of focused light smaller than what scalar diffraction theory predicts. Susanne Quabis et al. published a remarkably clear and intuitive article in 2000 where they report that it is possible to produce foci of light of area as small as $0.1\lambda^2$ (where $\lambda$ is used to represent the wavelength of the focused beam) using annular pupil apertures and radial polarisation. Most of the efforts to tailor or engineer the distribution of the state of polarisation of a beam have been aimed to produce the smallest possible spot of light at the region of focus, and hence achieve what is commonly referred to as imaging beyond the diffraction limit. These schemes, referred to as sub-diffraction limit imaging methods, base their so-called "super-resolution" on detecting the intensity of all the light that has been scattered from a spot of light that is smaller to what scalar diffraction predicts. Important attempts have also been made to determine the three-dimensional orientation of single molecules.

Reference is made to the method reported in 2005 by Ellis and Dogariu in which they describe a near-field method for characterising the polarisation properties of electromagnetic fields for which the electric field vector at a point may fluctuate in three dimensions. In their publication they model and measure the superposition of three orthogonal laser light beams generated by three independent laser sources, which form a three-dimensional electromagnetic field at the point where they intersect. Ellis and Dogariu used 9 different configurations of a near-field detector that consisted of two opposing near-field sharp fibers placed in close proximity to the point of the intersection of the beams. The relevance of their work to the present invention is the experimental verification, although by means of a near-field method, that there exists important and retrievable information in a three-dimensional electromagnetic field, they call this retrieval of polarisation information: "three-dimensional optical polarimetry".

The aforementioned describes the principles of how it is possible to engineer a three-dimensional electromagnetic field by means of focusing a beam of light with a chosen distribution of the state of polarisation across its waist, using an optical system with a sufficiently high N.A. If such an illuminating focused beam impinges on a sample to be observed, i.e. optically analysed, the electromagnetic field that results from the interaction of the illumination light and the sample will be, in general, a three-dimensional vector field.

Most of the current optical methods for storing and reading data, and for analysing materials and biological tissue are based on the illumination, detection, and processing of the optical signal at a plane that is an optical conjugate of the recorded medium or sample under observation. For this reason the information is limited by the size of the smallest spot of light on the sample that those methods can produce. The vast majority of the optical storage methods are based on the principle of the confocal microscope, which relies on the collection of all the energy scattered from a sample in one single detector. This does not provide any means to retrieve information of the interaction of the sample with the longitudinal component of the focused field.

There are other methods that not only detect the total intensity of the scattered field but they also analyse the state of polarisation at a plane that is a conjugate to the sample. Such is the case of the multiplexing method by Torok et al., where they suggest the use of a polarising beam-splitter to multiplex the signal encoded in the angular orientation of a step-like feature in an optical disk. By using polarisation they claim that it is possible to detect different orientations of the step-like feature. There is no account in the patent by Torok et al. of the influence of the longitudinal component of the scattered field on the pupil of the optical system.

Only two patents and one scientific publication have made use of a limited part of the information of the state of polarisation on the pupil plane to assess optical properties of the object under observation. In the patent by Zhan and Legger and the one by Gold et al. only homogeneous linearly polarised light is used, which means that the longitudinal component of the electric field is zero at the center of the focused spot (on the optical axis), and negligible at positions near the optical axis. Hence, the EM field used to illuminate the sample is not considered as a three-dimensional field. The patents by Zhan and Legger and by Gold et al. relate to an incomplete polarimetry method known as ellipsometry. Both inventions treat the illumination and scattered field as simply composed by a finite number of rays with different angles of incidence on the sample, and do not even acknowledge that the field formed on the focusing region depends on the distribution of the state of polarisation on the entrance pupil of the illumination arm.

One scientific paper has been published where the authors claim they can simulate the assessment of the effect of a sample on the longitudinal component of a focused field. The technique reported is called "Z-polarised confocal microscopy". The biggest limitation of this technique is that it only attempts to measure the effect of the sample on the longitudinal component of the field and no strategy is mentioned as to how to measure the effect of the sample on the transverse components of the focused field.

It is an object of the present invention to provide a new method or strategy to optically inspect a sample which is capable to retrieve information that is not available to any of the current state of the art technologies. Such a method or strategy would open a new domain for information from a sample to be read and stored.

It is a further object of the present invention to provide a method to measure or estimate a three-dimensional electromagnetic field without the need of a near-field probe.

SUMMARY OF THE INVENTION

Accordingly, the present invention provides a vectorial polarimetry apparatus and method for analysing the three-dimensional electromagnetic field resulting from an interaction between a focused illuminating beam and a sample to be observed, by characterising the distribution of the state of polarisation of light across a measurement plane.

The apparatus of the invention comprises:
a) a spatial polarisation state generator comprising an illumination source for generating a beam of light and means to control the state of polarisation at different positions across the beam width of the light beam;
b) a focusing system for bringing said illuminating light beam to a focus, wherein the focusing system has a numerical aperture high enough as to produce a tight focus with a suitable three-dimensional vectorial structure at the focus; and
c) at least one spatial polarisation state analyser comprising a polarisation sensitive detector that can measure the state of polarisation of the light from the sample at different positions across the width of the measuring plane to retrieve information on the three-dimensional vectorial electromagnetic interaction of the illuminated focused field and the sample.

According to one embodiment of the invention the apparatus further comprises a light splitter through which both the illuminating light beam and the reflected light from the sample pass, and for separating the illuminating light from the reflected light.

Preferably the light splitter comprises at least one beam splitter. The beam-splitter is preferably a non-polarising beam splitter. The light splitter may also function to reflect light from the sample toward the spatial polarisation state analyser.

The light splitter may comprise at least one mirror that covers only a part of the cross section of the illumination as to reflect some of the light towards the sample and let some of the light go through towards the detection arm, although alternative designs are envisaged and may be employed.

According to one embodiment of the invention, the apparatus further comprises a high numerical aperture optical collector for capturing the light that has been scattered by the sample.

According to one embodiment of the invention the apparatus may work in reflection configuration. Alternatively, the apparatus may work in transmission configuration.

Preferably the means to control the state of polarisation at different positions across the beam width of the light beam is a spatial polarisation state control which is preferably further adapted to control the state of polarisation of both the illuminating and detected light.

In accordance with one embodiment of the invention, the or each spatial polarisation state analyser is adapted to measure the spatial distribution of the Stokes vector.

Preferably, and in accordance with any embodiment, the spatial polarisation state analyser comprises means for measuring the state of polarisation at different positions on the measuring plane. The spatial polarisation state analyser may comprise a polarisation state analyser and an intensity detector with spatial resolution across the width of the measuring plane.

According to one embodiment of the invention, the polarisation state analyser comprises sequential combinations of waveplates and polarisers that can measure the state of polarisation in combination with the pixelated detector.

The apparatus may comprise a plurality of polarisation analysers, each polarisation analyser taking a light intensity measurement at a different position in the measuring plane. The multiple light intensity measurements may then be performed sequentially in time. Alternatively the multiple light intensity measurements may be performed simultaneously by splitting the light and using more than one optical detector.

Preferably the detector comprises at least one pixelated detector for performing the intensity polarimetry measurements at different positions across the measuring surface. The at least one pixelated detector may be a CCD. The at least one pixelated detector may alternatively be an array of photodiodes or any other type of pixelated detector.

Preferably the apparatus further comprises a control and processing unit.

The control and processing unit may comprise:
- means for controlling the spatial polarisation state generator,
- means for synchronising the measurements of the spatial polarisation state analyser, and
- means for processing the acquired data to estimate the three-dimensional vectorial field and/or characteristics of the observed sample.

The control unit may be arranged so as to synchronise and process the operation and the data measured by the apparatus.

According to one embodiment of the invention the apparatus of the invention further comprises:
- at least one spatial polarisation state analyser comprising a polarisation sensitive detector that can measure the state of polarisation of the reflected or transmitted light at different positions across the width of the measurement plane; and
- at least one confocal polarisation state analyser comprising a polarisation sensitive detector that can measure the state of polarisation of light returning from different positions within the sample to retrieve information on the three-dimensional vectorial electromagnetic interaction of the illuminated focused field and the sample together with the confocal polarisation sensitive image of the sample.

This embodiment may additionally comprise a first light splitter to direct reflected light from the sample to the at least one spatial polarisation state analyser; and a second light splitter to direct reflected light from the sample to the at least one confocal polarisation state analyser.

Preferably said confocal polarisation state analyser is adapted to choose measurements that return from different depths within the sample.

According to one embodiment, the first beam splitters are arranged so that light that returns from the sample is first directed towards the spatial polarisation state analyser and then to the confocal polarisation state analyser.

According to a further embodiment, the first beam splitters are arranged so that light that returns from the sample is first directed towards the confocal polarisation state analyser and then to the spatial polarisation state analyser.

The illumination/light source may comprise at least one laser. According to one embodiment, the light source comprises a laser and a spatial filter in combination with a collimator lens to expand the output of the laser to produce a resulting collimated beam.

The illumination/light source may contain one or a combination of wavelengths.

Preferably the means to control the state of polarisation at different positions across the beam width of the light beam is a spatial polarisation state control. Preferably the spatial polarisation state control comprises a pixelated or continuous spatial light modulator (SLM). The spatial polarisation state control may comprise a liquid crystal SLM followed by any polarisation optics like polarisers, prisms and waveplates, or other optical components.

The means to control the state of polarisation at different positions across the width of the light beam may suitably comprise discrete polarisation elements. Such discrete polarisation elements may be selected from the group comprising a pixelated spatial light modulator, continuous polarisation devices, or phase and amplitude masks.

Preferably the polarisation state generator can act selectively across the beam's width.

The focusing system may comprise a combination of refracting and/or reflecting surfaces. The focusing system may suitably comprise a diffraction grating.

The focusing system may be arranged so as to further collect the reflected light from the sample.

The apparatus of the invention may further comprise an optical system for selecting the optical measuring plane. The measuring plane may be conjugate to the entrance pupil of the focusing system. Preferably the optical system comprises means for optically conjugating the exit plane of the spatial polarisation state control and the entrance pupil of the focusing system. The optical system is preferably a 4f system.

The optical system may comprise means for producing an image of the same entrance pupil of the focusing system onto the detector measuring plane. Preferably the measurement plane is an exit pupil of the optical system.

The invention further provides a method for analysing the three-dimensional electromagnetic field resulting from an interaction between a focused illuminating beam and a sample to be observed, by characterising the distribution of the state of polarisation of light across a measurement plane, the method comprising the steps of:
- a) generating a beam of illuminating light;
- b) controlling the state of polarisation at different positions across the beam width of the light beam;
- c) focussing said illuminating light beam to a focus, wherein said focus is a tight focus and said focused light has a suitable three-dimensional vectorial structure at the focus;
- d) detecting and measuring the state of polarisation of the reflected light at different positions across the width of the measurement plane to retrieve information on the three-dimensional vectorial electromagnetic interaction of the illuminated focused field and the sample.

Preferably the method further comprises the step of controlling the state of polarisation of the detected light.

In accordance with one embodiment of the invention the method further comprising the step of measuring the spatial distribution of the Stokes vector.

Preferably the method further comprises the step of measuring the state of polarisation at different positions on the exit pupil.

The method may further comprise the step of taking light intensity measurements at different positions in the measuring plane. Multiple light intensity measurements may be performed sequentially in time. Alternatively, the multiple light intensity measurements may be performed simultaneously by splitting the light and using more than one optical detector.

Preferably the method further comprises the step of processing the acquired data to estimate the three-dimensional vectorial field and/or characteristics of the observed sample.

According to one embodiment of the invention, the method further comprises:
- calculating the electromagnetic field of the illuminating light beam in the focal region;
- calculating the electromagnetic field that results from interaction of a field and a point scatterer on the optical axis at the center of the focal region
- determining a polarisation quantity that varies across the pupil of the system as a means to retrieve information on the interaction between the illuminating light and the sample.

There is also provided a computer program comprising program instructions for causing a computer program to carry out the above method which may be embodied on a record medium, carrier signal or read-only memory.

Accordingly, the invention further provides a computer program comprising program instructions for causing a computer to perform a method for analysing the three-dimensional electromagnetic field resulting from an interaction between a focused illuminating beam and a sample to be observed, by characterising the distribution of the state of polarisation of light across a measurement plane, the method comprising the steps of:

e) generating a beam of illuminating light;

f) controlling the state of polarisation at different positions across the beam width of the light beam;

g) focussing said illuminating light beam to a focus, wherein said focus is a tight focus and said focused light has a suitable three-dimensional vectorial structure at the focus;

h) detecting and measuring the state of polarisation of the reflected light at different positions across the width of the measurement plane to retrieve information on the three-dimensional vectorial electromagnetic interaction of the illuminated focused field and the sample.

The invention disclosed in this document relates to an optical vectorial imaging method for reading and encoding information with applications in, for example, information storage, microscopy, molecular imaging, and optical metrology. The method can retrieve information of the interaction of a tightly focused light source and a sample under observation by measuring the spatial distribution of the complete or incomplete state of polarisation of light at an axial position in the detection arm of the optical system that is not necessarily a conjugate surface to the focused spot or sample under observation. A surface as such can be, but it is not limited to, the exit pupil of a microscope or a confocal microscope. This spatial distribution of the state of polarisation on the detection system will depend on the distribution of the state of polarisation across the illumination beam and the sample under observation, and this invention comprises the use of any polarimetry method to assess the effect of a sample or information storage medium on the spatial distribution of the state of polarisation across the measuring beam and/or detected beam.

The present invention constitutes, but is not limited to, a novel far-field alternative to the method reported in 2005 by Ellis and Dogariu in which they describe a near-field method for characterising the polarisation properties of electromagnetic fields for which the electric field vector at a point may fluctuate in three dimensions.

As mentioned above, if an illuminating focused field impinges on a sample to be observed, i.e. optically analysed, the electromagnetic field that results from the interaction of the illumination light and the sample will be, in general, a three-dimensional vector field. The invention disclosed in this document relates to a method to measure or estimate this resulting three-dimensional electromagnetic field without the need of a near-field probe. For this characterisation at least one illuminating vector EM field is needed but it is possible to use more than one illumination fields (e.g. sequentially) for robustness and/or over-determination.

It will be appreciated that the present invention is not a simple substitute to any of the aforementioned technologies; it constitutes a new method or strategy to optically inspect a sample which is capable to retrieve information that is not available to any of the current state of the art technologies. Therefore it opens a new domain for information from a sample to be read and stored.

The subject of the present invention must not be compared to a technique known as imaging polarimetry, where the polarisation properties of different positions within a sample are measured at once using an imaging optical system. In imaging polarimetry these different positions must be separated enough to be resolved, according to scalar theory, with the imaging system, and the measurements are made on a plane that is a conjugate to the sample.

Likewise, the present invention must not be compared to the measurement of polarisation aberrations either. The effect of polarisation aberrations on the size of a focusing spot has been studied for several years, but up this date there has not been a report of measuring the polarisation information on the pupil of an optical system after the light has scattered from the object under observation.

The invention reported here presents a strategy to assess the effect of the sample on the whole three-dimensional EM vector field and for any possible configuration of the focused field. In Z-polarised confocal microscopy a phase mask is used at the position of the pupil plane but the detection of the collected light is made with a confocal system, therefore the field that goes through the pupil phase mask is averaged and never resolved spatially.

The optical pupil has access to the largest possible area where the longitudinal component of the field can be projected and have a significant effect. By placing a spatially divided detector on this pupil with N number of pixels the dimensionality and the possibilities for optical multiplexing may increase, in principle, by a factor of N. As an example one could use a readily available 64 by 64 CCD detector and increase the range of the multiplexing scheme at least by a factor of 4096, further multiplied by the detection bit-depth and the four dimensions of the state of polarisation at each detector pixel.

It will be appreciated that the term "three-dimensional" is used herein to indicate that in each and every point in the volume region around the focus of a sufficiently high Numerical Aperture (N.A.) optical system, the oscillation of the electromagnetic field can occur in any or all of the three orthogonal space directions simultaneously.

In the volume region around the focus all three components of the electric vector, at each and every point in space, can be non-zero:

$$E^1(x', y', z) = \begin{pmatrix} E_x^1(x', y', z) \\ E_y^1(x', y', z) \\ E_z^1(x', y', z) \end{pmatrix}.$$

The term "high" as used herein when referring to Numerical Aperture throughout the present application means a numerical aperture of close to 0.6 and above, at which the longitudinal component of a focused field starts to become significant.

In the present invention, the method and apparatus are aimed at analysing three-dimensional fields that are formed when a beam of light is focused at high numerical apertures. The three-dimensional nature of these so-called "tightly" focused beams is well documented (see in background to the invention section). The present invention relates to a method and apparatus to extract information of these three-dimensional fields. This has not been suggested before, and prior art systems are not capable of extracting this information. In the present invention, the method and apparatus are such that an infinite number of different Stokes vectors can be measured from a single point within the object, even when the illumination is kept fixed.

In the present invention—herein referred to as "far-field Vectorial Polarimetry"—the illumination is not assumed to be a homogeneous distribution across the pupil before focusing the light by the microscope objective. This distribution of the state of polarisation determines three components of the electromagnetic vector at each point in the region around the focus. There are 9 linearly independent possibilities for this three-dimensional electromagnetic field at each and every point in the focal region (Ellis and Dogariu 2005). Similarly there are 9 linearly independent possibilities for the result of the interaction of the illumination with a small volume portion (pixel) within a sample inside the focal region. The structure of this field around the focus is determined also by the distribution of the state of polarisation across the pupil of the illumination beam, and there are infinite possibilities for the choice of distribution of state of polarisation across the pupil. The classical resolution criteria, such as the Airy disc, are of no use to determine the size of the portion of the sample being probed, but the sample however occupies a three-dimensional VOLUME as well. The dimensionality of the Vectorial Polarimetry approach is at least (9×9)×3=243, but the number of choices in the illumination are large if a spatial Polarisation State Generator (PSG) is used as described in the present invention. By spatial PSG, it is meant a PSG that can produce different states of polarisation at different position across the pupil of the beam to be focused; for example, by means of a Liquid Crystal Spatial Light Modulator. The number of possibilities of the shape of the focal region will depend on the device used, and it can add further independent possibilities (dimensions) for the illumination and the resulting electromagnetic field. The present invention is a method to register signals associated to all these effects.

The term "Spatial Polarisation State Generator", as used herein, refers to a device that can control the state of polarisation at different positions across the beam width of the illumination light beam. The device needs to have a pixilated or continuous non-homogeneous control of the state of polarisation at different positions across the beam width. One example of such a device is a pixelated Spatial Light Modulator that can control the polarisation retardance introduced by individual pixels (positions) across the width of the illumination beam, and with this have control on the state of polarisation at different positions across the width of the beam. A conventional "spatial filter" cannot, under any circumstances, fulfill this role.

In the present invention, for each point in the sample, and for any given illumination, the state of polarisation at different positions in a suitable measuring plane is to be measured. Such measuring plane can be conjugate to the entrance pupil of the focusing objective lens and, therefore, is not limited to a single point or pinhole. A pixelated detector, for example (like a CCD), can perform the spatial division of the measuring plane.

BRIEF DESCRIPTION OF THE DRAWINGS

The present invention will be more clearly understood from the following description with reference to the accompanying drawings, in which:

FIG. 3a is a schematic representation of a beam of light being focused by an optical system $\Sigma$ in the region $\Omega$ and the EM field $E^2(x',y',z \simeq z_i)$ that results from the interaction between the illumination and the sample (prior art).

FIG. 12 is a schematic representation of the geometry used to make the numerical calculations reported in the present description.

DETAILED DESCRIPTION OF THE DRAWINGS

The EM field in the focal region $\Omega$ of a focused beam depends on the initial spatial distribution of the EM field across the area covered by the original beam (before the focusing occurs), the wavelength of light, and the N.A. of the focusing system and its aberrations. The initial EM field is written as $E^0(x,y)$ to emphasise that its spatial distribution could be any function of the coordinates x and y. It should be appreciated that the state of polarisation of light across the beam is not necessarily the same at every point that has coordinates (x,y).

Figure 1:
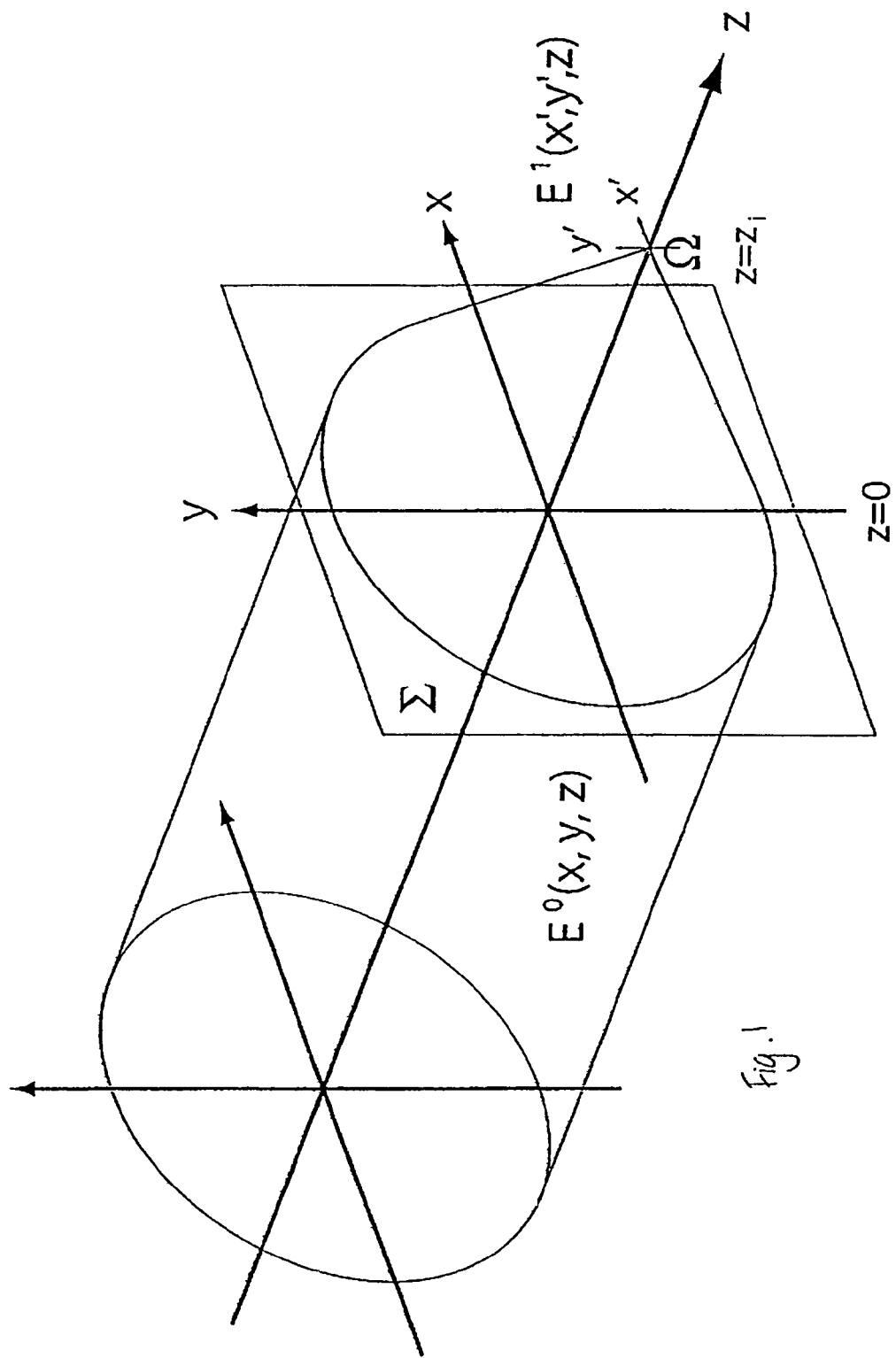
FIG. 1 is a schematic representation of a beam of light being focused by an optical system $\Sigma$ in the region $\Omega$ (prior art).
Figure 2:
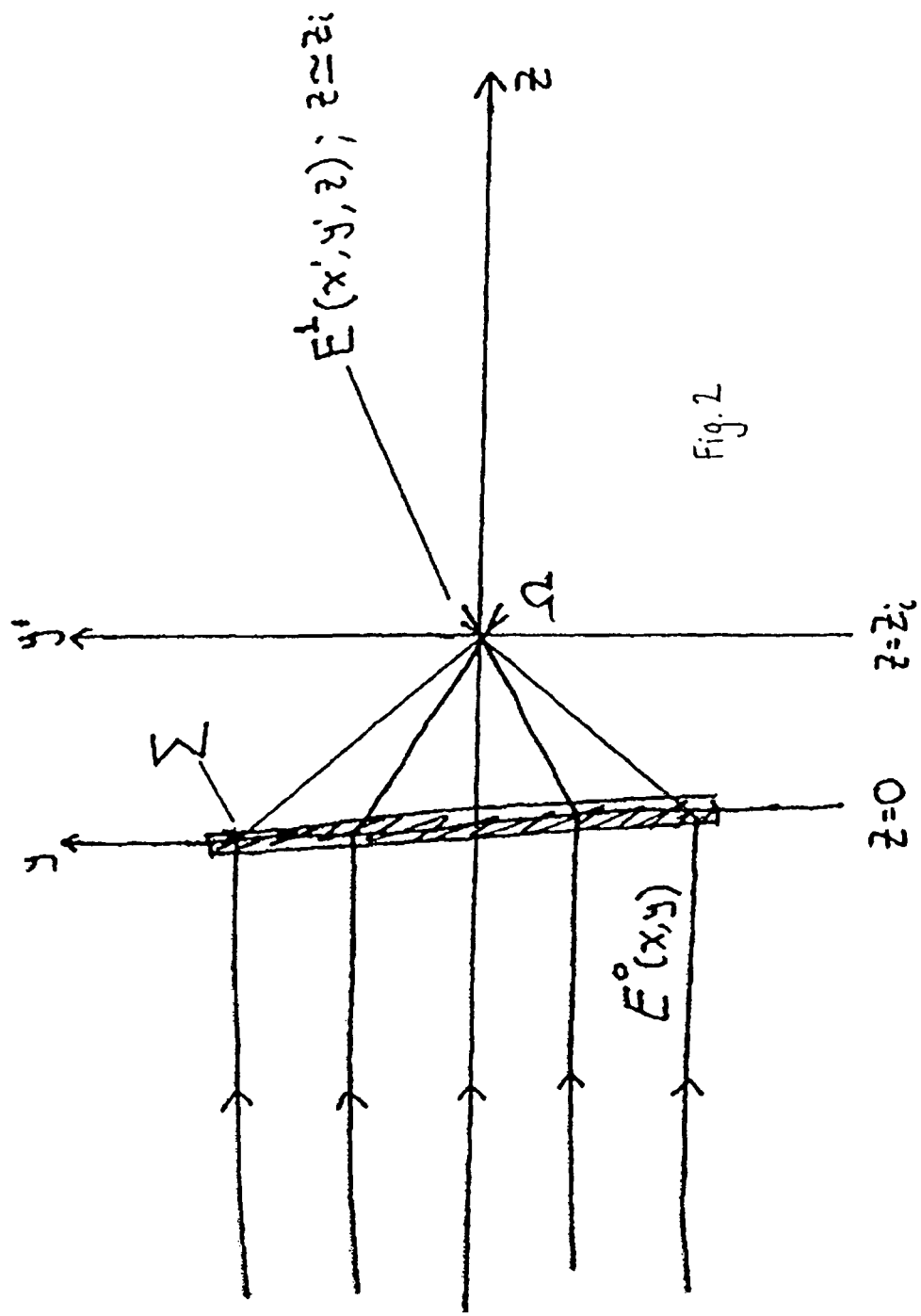
FIG. 2 is a further schematic representation of a beam of light being focused by an optical system $\Sigma$ in the region $\Omega$ (prior art).

FIGS. 1 and 2 are schematic representations of a beam of light being focused by an optical system $\Sigma$ in the region $\Omega$. FIG. 2 represents a transverse cut of FIG. 1.

As mentioned above, in the region around the focus, denoted by $\Omega$, where the light is brought to a focus, the EM field has, in general, three vectorial components, which may vary as a function of the spatial coordinates x', y', and z. This three-dimensional field is denoted by $E^1(x',y',z \simeq z_i)$, where the $\simeq$ symbol simply indicates that the focal region has a small but finite extent around the axial position $z=z_i$. When a sample (the object under optical observation or the medium where some information is being encoded into or read from) interacts with this general EM field produced by the illumination, an EM field results which is also a three-dimensional vectorial EM field. Clearly, the resulting EM field can depend on the sample, including its effect on the longitudinal component of the illumination. For example, in the case of a single molecule the resulting EM field can depend on the orientation of the molecule's electric dipole moment, and in the case of a data storage medium, sub-diffraction-limit features of the recorded medium could also interact with any or all three vectorial components of the illumination. This resulting EM field is denoted as $E^2(x',y',z\,z_i)$ in FIGS. 3a and 3b.

FIG. 3a is a schematic representation of a beam of light being focused by an optical system $\Sigma$ in the region $\Omega$ and the EM field $E^2(x',y',z \simeq z_i)$ that results from the interaction between the illumination and the sample.

Figure 3B:
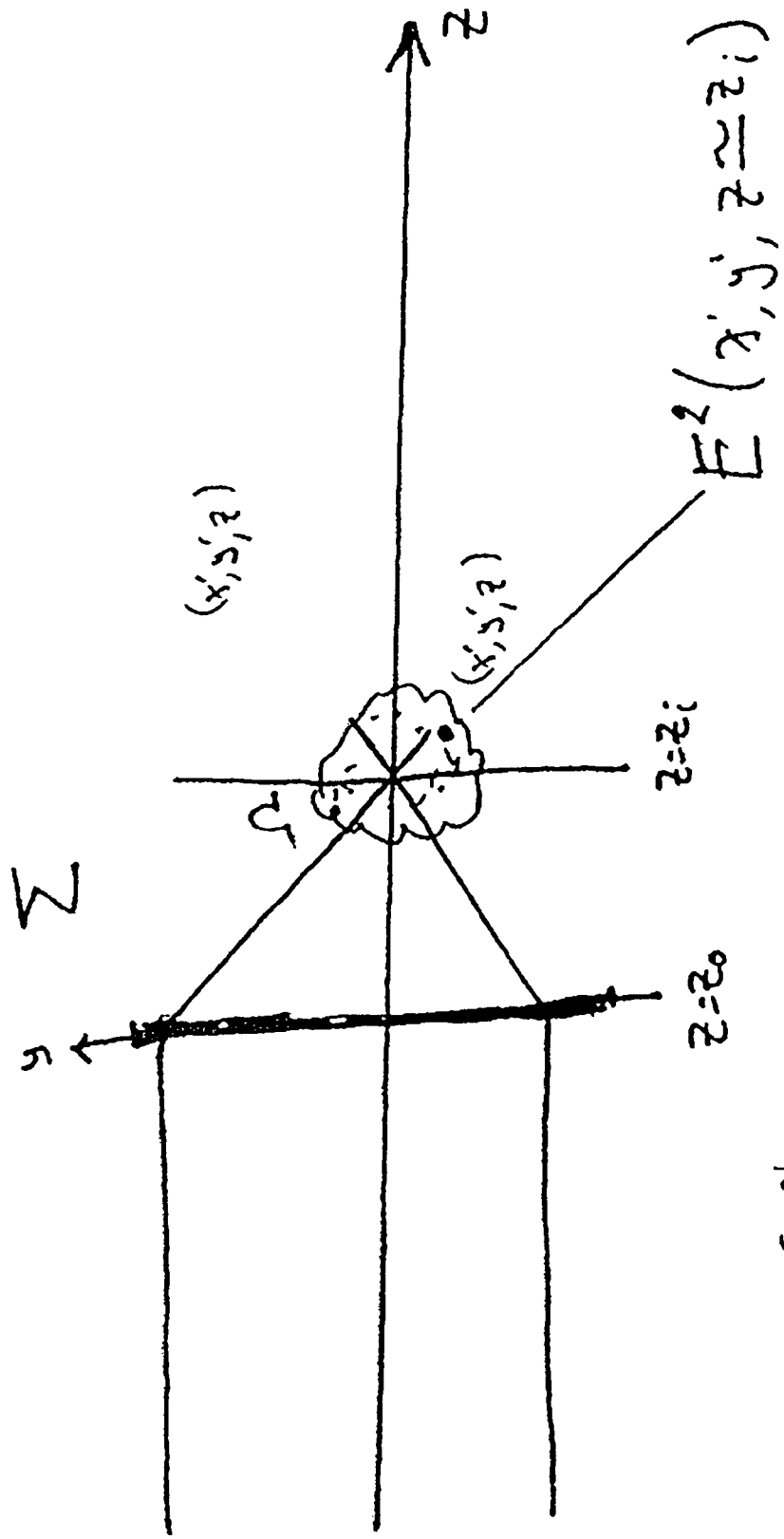
FIG. 3b is a further schematic representation of a beam of light being focused by an optical system $\Sigma$ in the region $\Omega$ and the EM field $E^2(x',y',z \simeq z_i)$ that results from the interaction between the illumination and the sample (prior art).

FIG. 3b is a schematic representation of a beam of light being focused by an optical system $\Sigma$ in the region $\Omega$ and the EM field $E^2(x',y',z \simeq z_i)$ that results from the interaction between the illumination and the sample. This figure represents a transverse cut of FIG. 3a.

The subject invention includes a new method to study, measure, analyse, detect, etc., this EM field, $E^2(x',y',z \simeq z_i)$, that results from the interaction of the illumination field and the sample. The method consists on the assessment of the spatial or spatio-temporal distribution of the state of polarisation of $E^2(x',y',z \simeq z_i)$ on a plane that is not necessarily a conjugate to the focal region $\Omega$. The exit pupil of the optical system is a good example of such a plane, or any other plane optically near the exit pupil. The exit pupil in Optics is defined as the image of the aperture stop of an optical system as seen through the optical system from the image space; this is a good example of a plane to measure the distribution of the state of polarisation but other planes where the projection of the longitudinal component of the focused field and/or the field that results from the interaction of the illumination with the sample is not negligible may be used.

Figure 4:
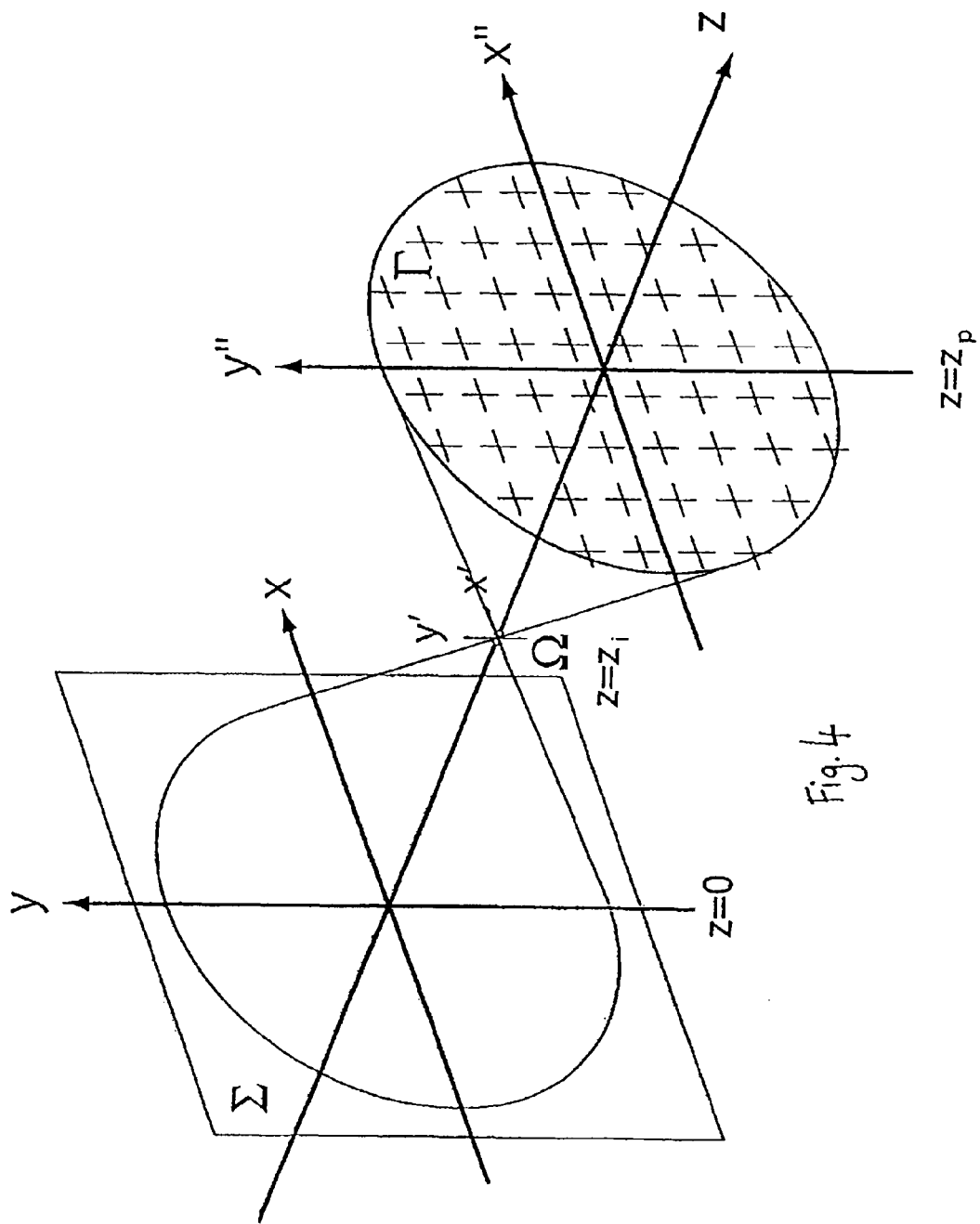
FIG. 4 is a schematic representation of the light that results from the interaction of a focused field and a sample as it propagates through an optical system onto a plane $\Gamma$ where the distribution of the state of polarisation can be measured with a method and apparatus as described in the present invention.
Figure 5:
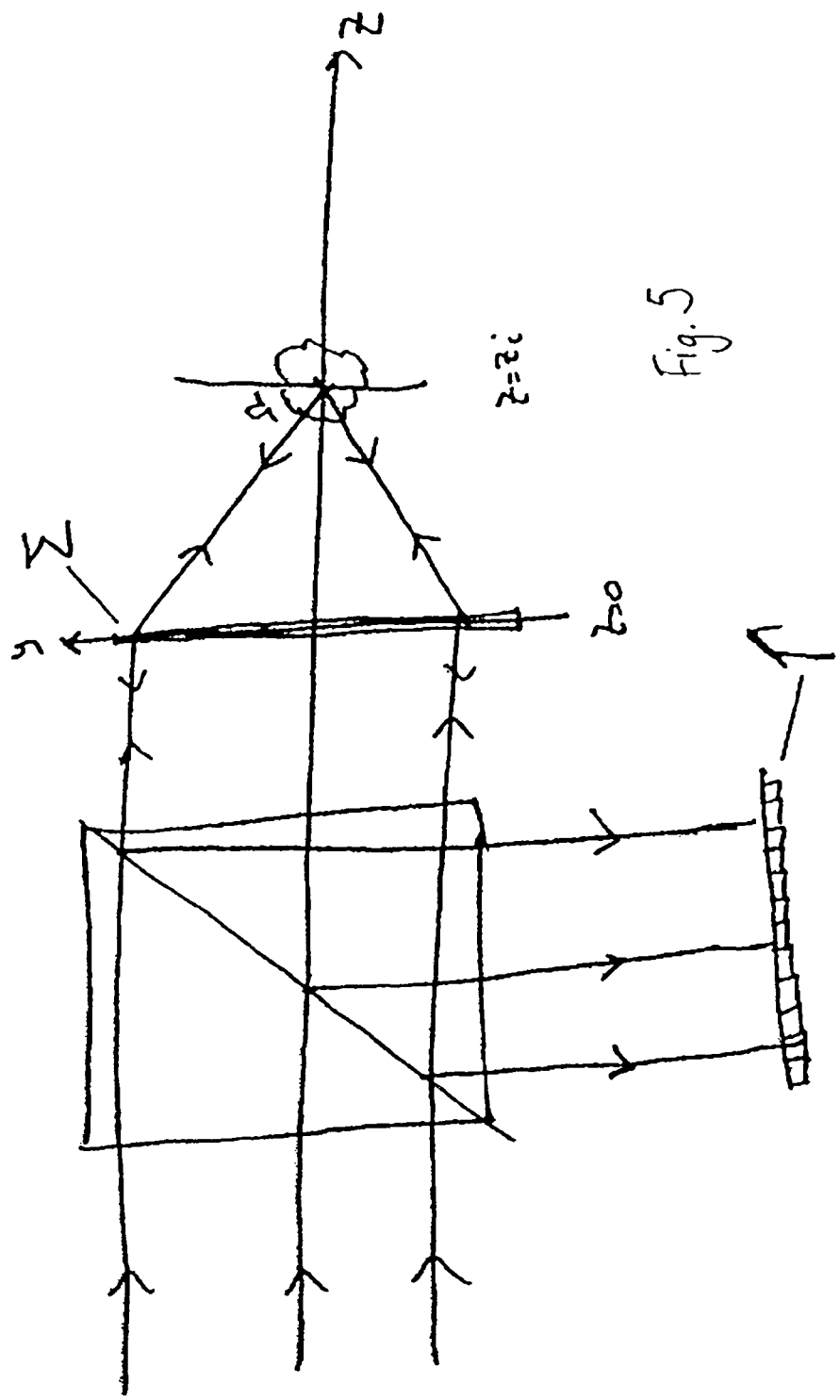
FIG. 5 is a representation of a reflection configuration within an apparatus of the invention.

FIG. 4 shows a schematic representation of an example of such a measurement in the particular case where the collecting (imaging) arm is facing the illumination arm, which results in a transmission configuration. The invention, however, also comprises reflection configurations, for which the illumination focusing objective acts as a collector as well, like in FIG. 5 or in any reflection-type microscope system. The measuring plane $\Gamma$ is referred to as the pupil plane because the optical pupil of the system is an excellent candidate for the measurements, but $\Gamma$ can be any other surface where a projection of the longitudinal component of the focused field is not negligible; see FIG. 6.

FIG. 4 is a schematic representation of the light that results from the interaction of a focused field and a sample as it propagates through an optical system. This invention relates to the idea of completely or incompletely characterising the distribution of the state of polarisation of light across a plane like the exit pupil $\Gamma$. The crosses represent examples of sample points but the distribution can be measured using any geometry or any pixel shape and size.

Figure 6:
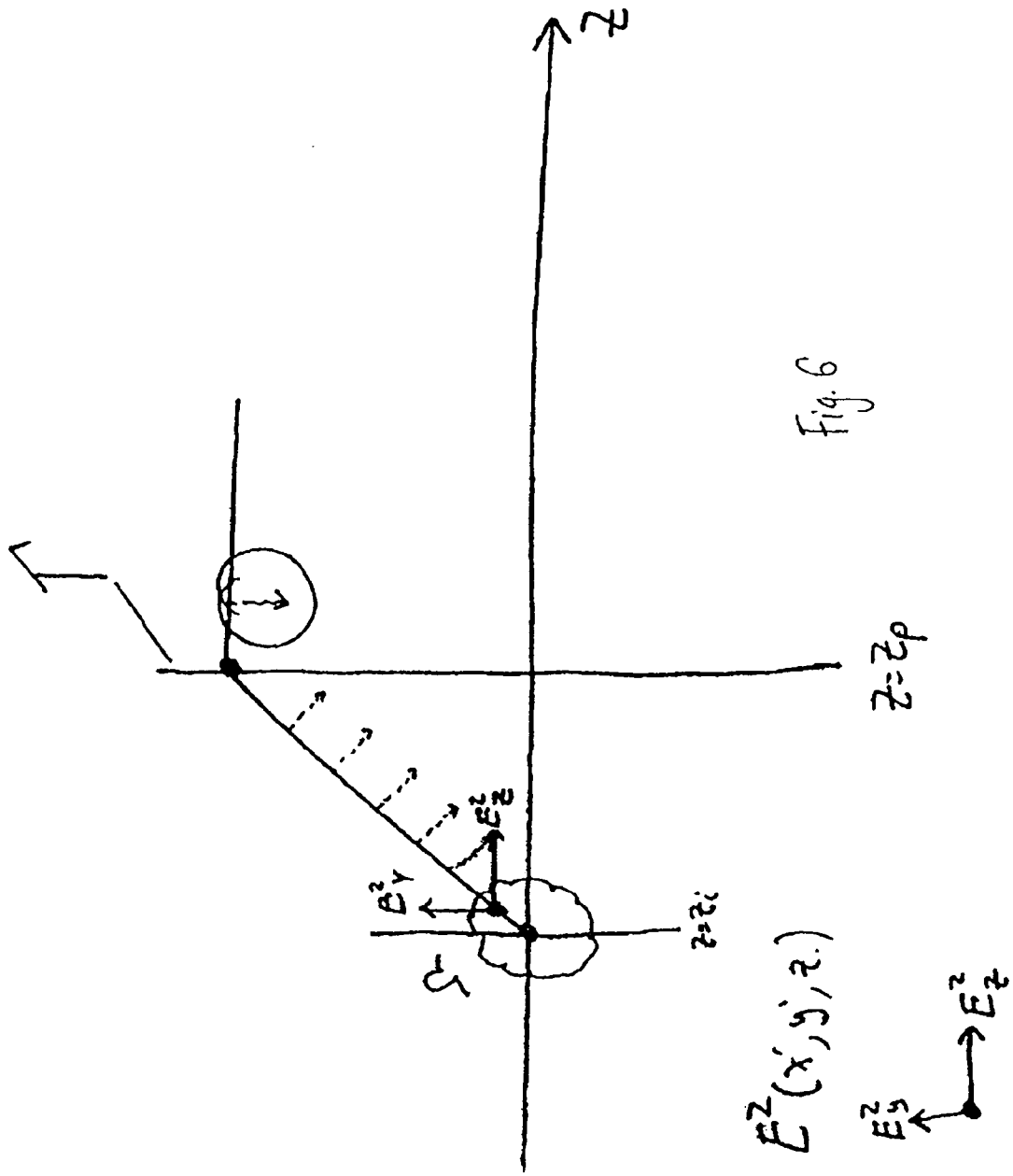
FIG. 6 is a representation of a suitable measurement surface.

As seen in FIG. 6, a suitable measurement surface $\Gamma$ can be any surface in the optical system where the projection of the longitudinal component of the focused field does not have a negligible magnitude for the polarimetry measurement to be meaningful.

The measurement of the state of polarisation at each position on the pupil $\Gamma$ can be made by any existing or to-be-developed polarimetry or ellipsometry method. The spatial discrimination of the distribution of the state of polarisation can be performed with a spatially divided detector like, for example, a CCD, which divides the measuring plane in small pixel elements of arbitrary chosen shape and size. In front of the CCD any Polarisation State Analyser (PSA) can be used to determine the state of polarisation as a function of the pixel distribution of the detector. Obviously, more than one pixelated detectors can be used depending on the polarimetry method of choice. The assessment of the state of polarisation of the light can be done routinely nowadays using well established polarimetry methods. The most important claim of this invention is that by measuring and analysing the distribution of the state of polarisation on the pupil plane it is possible to retrieve information of the three-dimensional vectorial EM interaction of the illumination focused field and the sample, and no one has reported this before. Furthermore, this analysis can be repeated more than one time using different illumination fields, simply by engineering the distribution of the state of polarisation on the entrance pupil of the illumination arm, as explained above.

Figure 7:
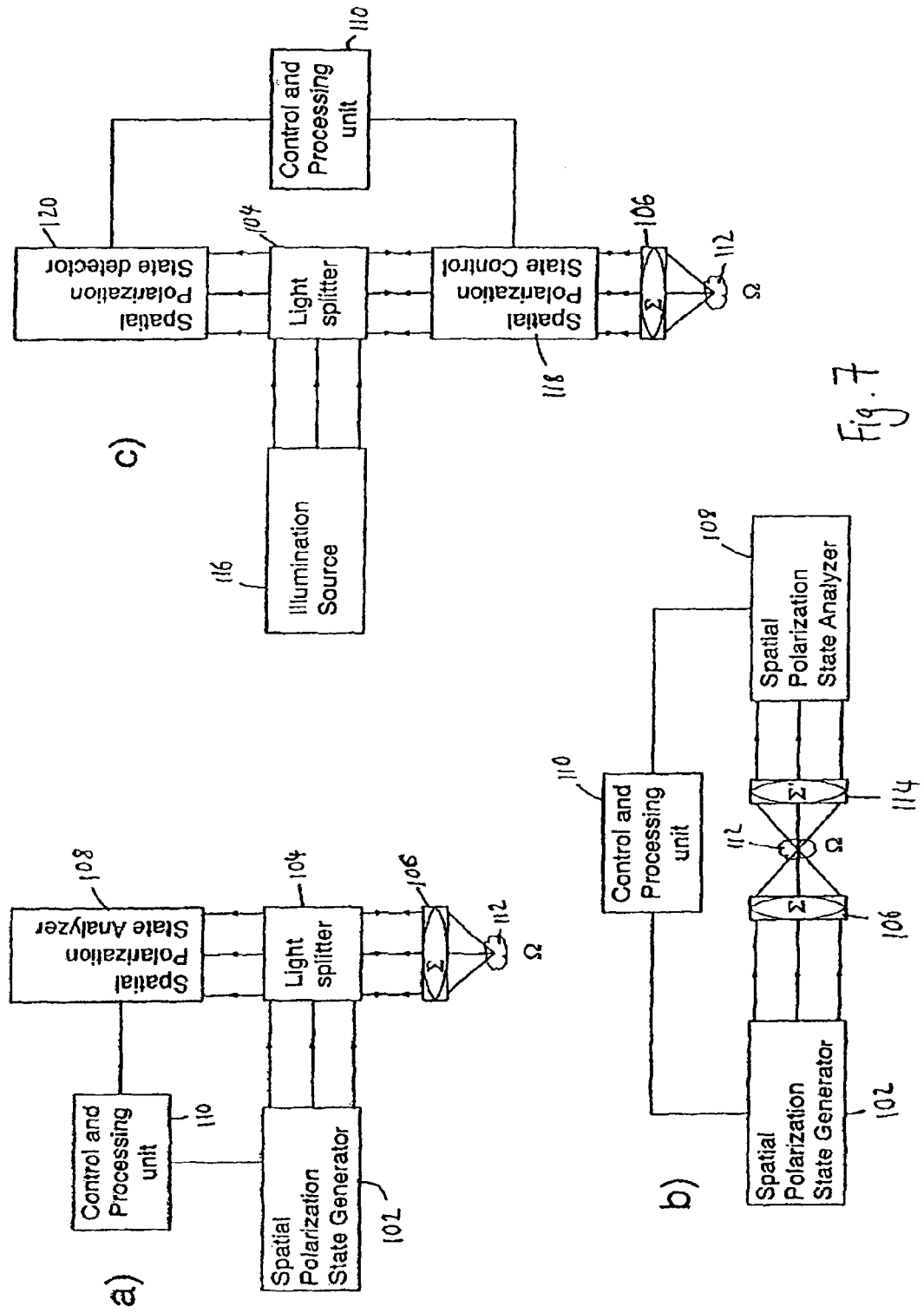
FIGS. 7a-7c show vectorial polarimetry apparatuses according to various embodiments of the present invention.

FIG. 7a) shows a vectorial polarimetry apparatus according to one embodiment of the present invention. The apparatus has a reflection configuration. Its basic components are a spatial polarisation state generator 102, a light splitter 104, a focusing system 106, a spatial polarisation state analyser 108 and a control and processing unit 110. The characteristics and design of the sample 112 can be part of the apparatus in an optical data storage embodiment, see FIG. 11.

The spatial polarisation state generator 102 comprises a light (illumination) source and a means to control the state of polarisation at different positions across the beam width. This can be achieved by, for example, discrete polarisation elements like a pixelated spatial light modulator, continuous polarisation devices like a space-variant waveplate, or by simple phase and amplitude masks.

The light splitter is any device that can separate the illumination arm from the detection arm. This can be easily done by light beam splitters, for example a cube, a pellicle, or a plate. Another alternative is to use mirrors that cover only a part of the cross section of the illumination as to reflect some of the light towards the sample and let some of the light go through towards the detection arm. The use of any other light splitter is also comprised in this invention.

The focusing system $\Sigma$ in this configuration is the responsible of bringing light to a focus, and also acts as the collector of the light that returns from the sample. As mentioned earlier, this system can be a combination of refracting and/or reflecting surfaces, a diffraction grating or any other suitable optical system. The only requirement is that the numerical aperture is high enough as to produce a tight focus with a suitable three-dimensional vectorial structure at the focus.

The spatial polarisation state analyser comprises a polarisation sensitive detector that can measure the state of polarisation at different positions across the width of the measuring plane $\Gamma$. The measurement of the spatial distribution of the Stokes vector, for instance, is a suitable type of measurement that the spatial polarisation state analyser can perform. This particular type of measurement can be done by any well known and established, or newly developed, polarimetry technique; it is repeated that the requirement for this invention is that the state of polarisation is measured, calibrated, and estimated at different positions across the measuring plane $\Gamma$. Continuing with the Stokes vector example, this measurement at each position in $\Gamma$ requires typically four light intensity measurements, each using a different polarisation state analyser; the measurements can be done sequentially in time, or simultaneously by splitting the light, using different polarisation analysers, and more than one optical detector. A pixelated detector—for example a CCD, or an array of photodiodes—can be an adequate means to perform the intensity polarimetry measurements at different positions across the measuring surface $\Gamma$. If light is split, then more than one pixelated detectors can be necessary.

The control and processing unit 110 comprises a means to control the spatial polarisation state generator, synchronise the measurements of the spatial polarisation state analyser, and process the acquired data to estimate the three-dimensional vectorial field and/or characteristics of the observed sample.

FIG. 7b) shows a vectorial polarimetry apparatus in the transmission configuration according to the present invention. Its basic components are similar to the apparatus in the reflection configuration, but the light splitter is not strictly necessary and a separate high numerical aperture optical collector Σ' 114 is necessary to capture the light that has been scattered by the sample. The description for the rest of the components is the same as in the reflection configuration example shown in FIG. 7a).

FIG. 7c) shows a vectorial polarimetry apparatus in the reflection configuration, in accordance with a further embodiment of the invention, that uses the spatial polarisation state control on the illumination and the detection arms. The apparatus comprises an illumination source 116 and separate spatial polarisation state control 118. The apparatus further comprises a spatial polarisation state detector 120. Someone skilled in the art can identify the advantages of such configuration. If the polarisation features across the measuring plane Γ for a given sample are well identified, one could design a system like the one in FIG. 7c) that picks such features without necessarily measuring all the polarisation properties of the sample.

Figure 8:
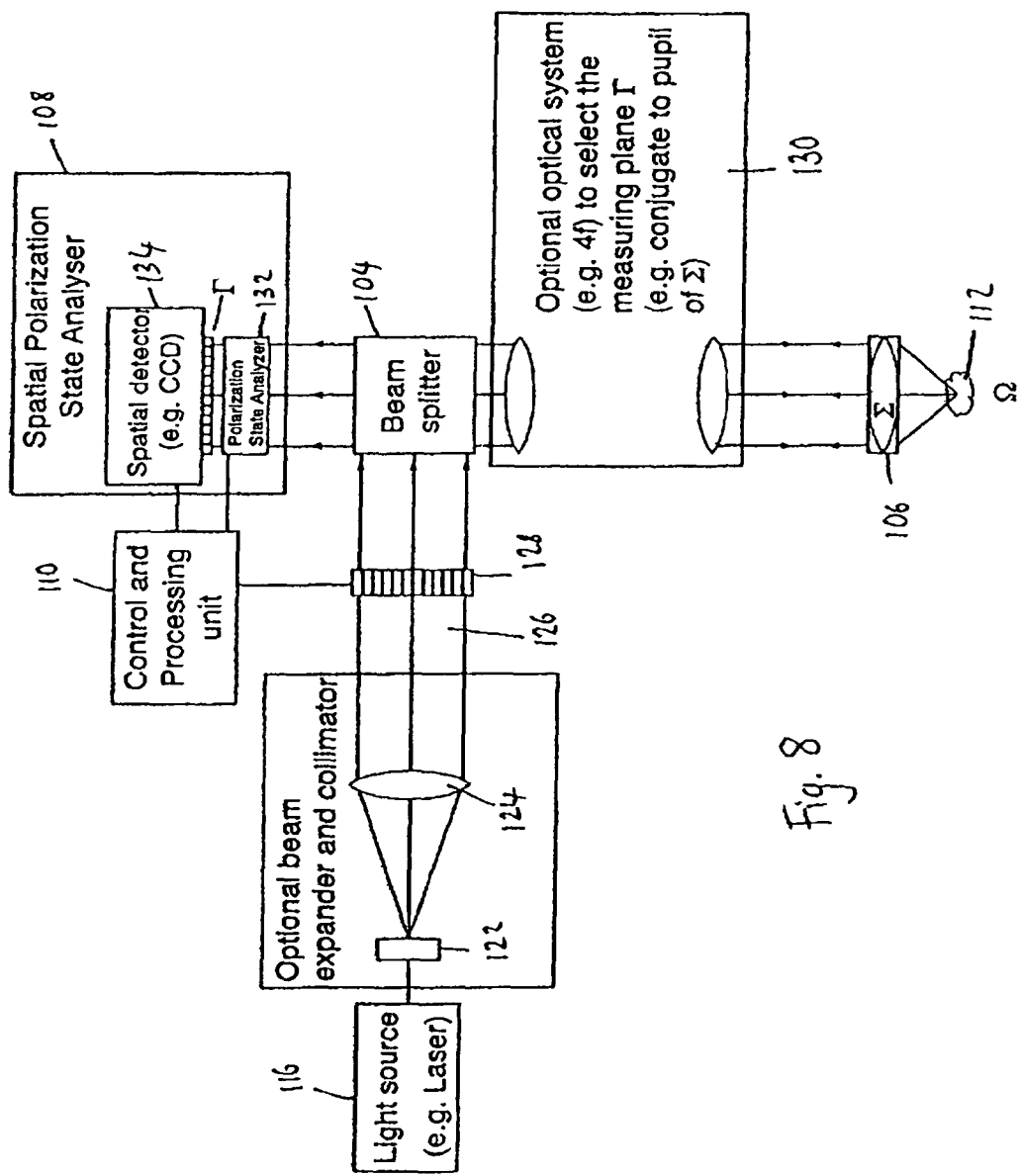
FIG. 8 is a detailed representation of one embodiment of a vectorial polarimetry apparatus according to the present invention.

FIG. 8 shows a further embodiment of a vectorial polarimetry apparatus according to the present invention. In the system in FIG. 8, the illumination light source 116 can be a laser which is then expanded by means of, for example, a typical spatial filter combination 122 with a collimator lens 124. The resulting beam 126, which can be collimated, passes through a spatial polarisation state control device 128. This device can be a pixelated or continuous spatial light modulator (SLM); an example of it is a liquid crystal SLM followed by any polarisation optics like polarisers, prisms and waveplates. The aim, as mentioned before, is to produce a beam with controlled state of polarisation at different positions across its width. This is achieved by the combination just described or any other polarisation state generators that can act selectively across the beam's width. The beam then passes through a beam-splitter 104 which can be a non-polarising beam splitter, and is reflected towards the sample 112. An optional optical system 130, for example a 4f system, between the beam-splitter and the focusing system Σ can be used to select the optical plane that is conjugate to the entrance pupil of the focusing system Σ 106.

For example, one possible choice is to optically conjugate the exit plane of the spatial polarisation state control and the entrance pupil of the focusing system Σ. At the same time, this optional optical system can produce an image of the same entrance pupil of the focusing system Σ onto the detector measuring plane Γ. The focusing system can be described as per the previous examples. Once the light returns from the sample and passes through the focusing system Σ and the optional optical system it will pass through the beam-splitter. Both passes through the beam-splitter, and through any optics involved, should be properly calibrated; this is possible by any readily available or newly developed method.

After the beam-splitter, the state of polarisation at different positions on the pupil will be measured by the spatial polarisation state analyser 108. This can be formed by a polarisation state analyser 132 and an intensity detector 134 with spatial resolution across the width of the measuring plane Γ.

The polarisation state analyser 132 in this case can be formed by sequential combinations of waveplates and polarisers that can measure the state of polarisation in combination with the pixelated detector. Again, a control unit 110 synchronises and processes the operation and the data measured by the apparatus.

Figure 9:
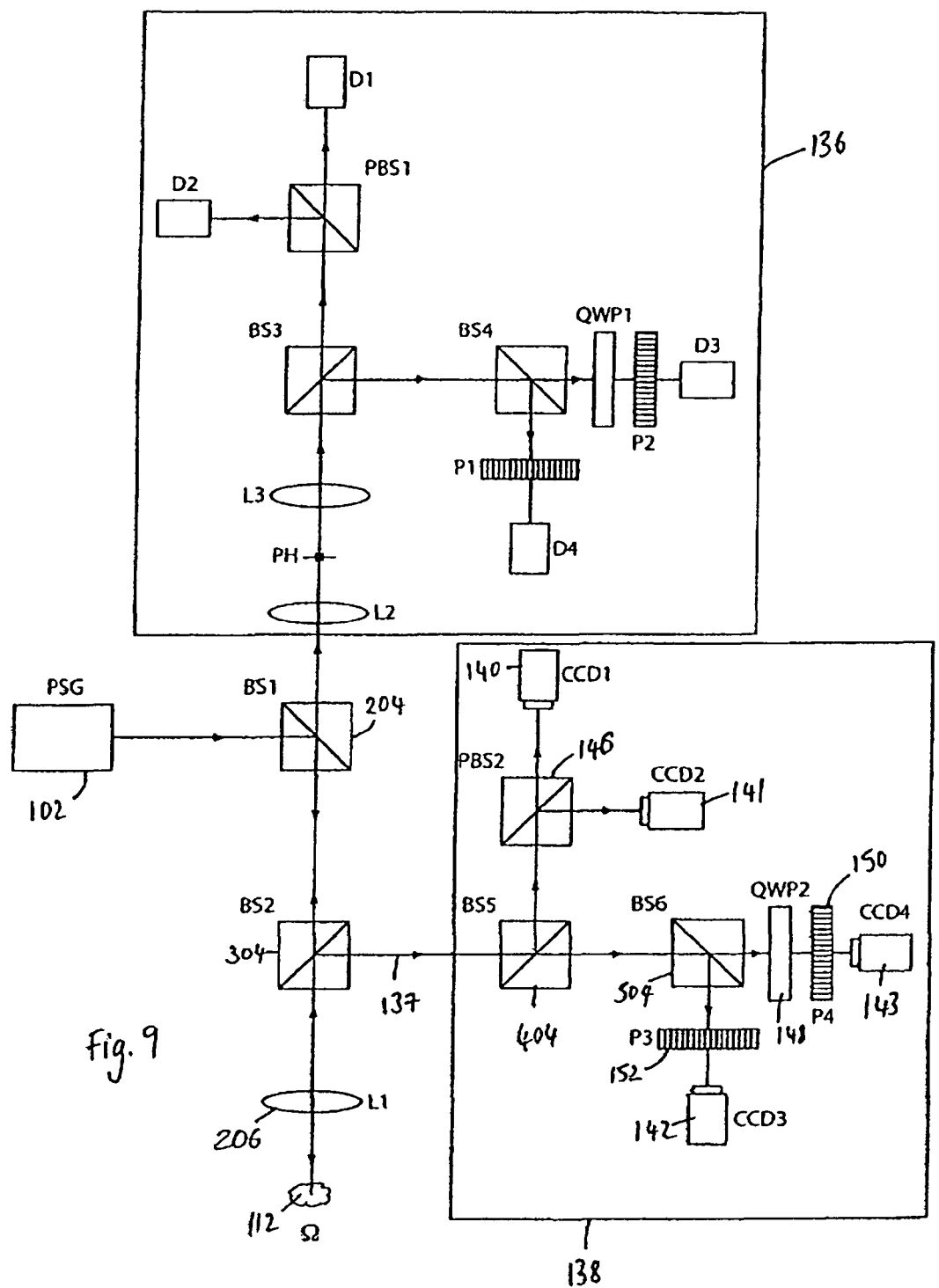
FIG. 9 is a detailed representation of a further embodiment of a vectorial polarimetry apparatus according to the present invention.

FIG. 9 shows a further embodiment of a vectorial polarimetry apparatus in accordance with the present invention. This embodiment comprises a confocal polarisation state analyser 136.

Light generated by the spatial polarisation state generator (PSG) 102 passes through beam-splitters BS1 204 and BS2 304 before reaching L1, which is the focusing system Σ 206. The light that returns from the sample is collected again by L1 206 and then separated by BS2 304 again.

One branch 137 goes towards a spatial polarisation state analyser 138: a division-of-amplitude polarimeter (DOAP) with pixelated detectors, CCD1-CCD4 140-143 that measure the state of polarisation at different positions across the measuring surface Γ', which is now a set of four optically identical surfaces for simultaneous measurements. BS5 404 and BS6 504 are beam-splitters that can be non-polarising. PBS2 146 is a polarising beam splitter that directs two orthogonal states of polarisation to pixelated detectors CCD1 140 and CCD2 141, for example, linear horizontal and linear vertical. QWP2 148 can be a linear quarter-waveplate oriented at 45 degrees with respect to linear polariser P4 150, and P3 152 can be a linear polariser at 45 degrees. Such DOAP can measure the Stokes vector at all pixels in the detectors, provided they are registered appropriately, instantaneously. It is another example of a spatial polarisation state analyser, but other types may be used.

The light that returns from the sample and passes through BS2 304 without being reflected will pass through BS1 204 again and then enter a confocal polarisation state analyser 136, which can be used to choose measurements that return from different depths within the sample.

Figure 10:
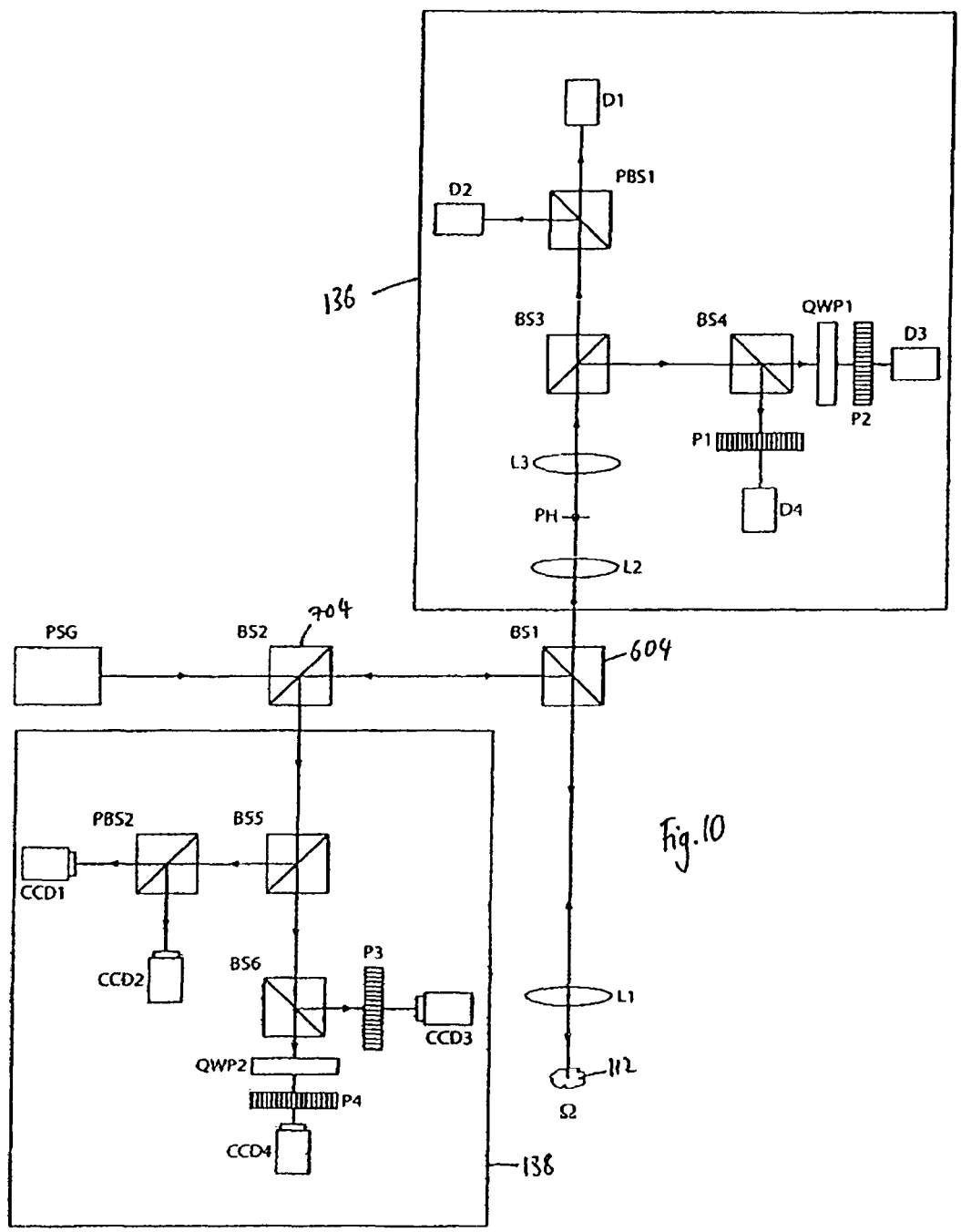
FIG. 10 is a detailed representation of a further embodiment of a vectorial polarimetry apparatus according to the present invention.

FIG. 10 shows a further embodiment of a vectorial polarimetry apparatus in accordance with the present invention. The difference between this embodiment and the previous embodiment is that in the embodiment shown in FIG. 10, the light that returns from the sample 112 is first directed towards the confocal polarisation state analyser 138 by beam-splitter 704 and then to the spatial polarisation state analyser 136 by beam-splitter 604, but the operation is the same. Through this difference it is possible to choose which polarisation state analyser receives more of the light that returns from the sample 112.

Figure 11:
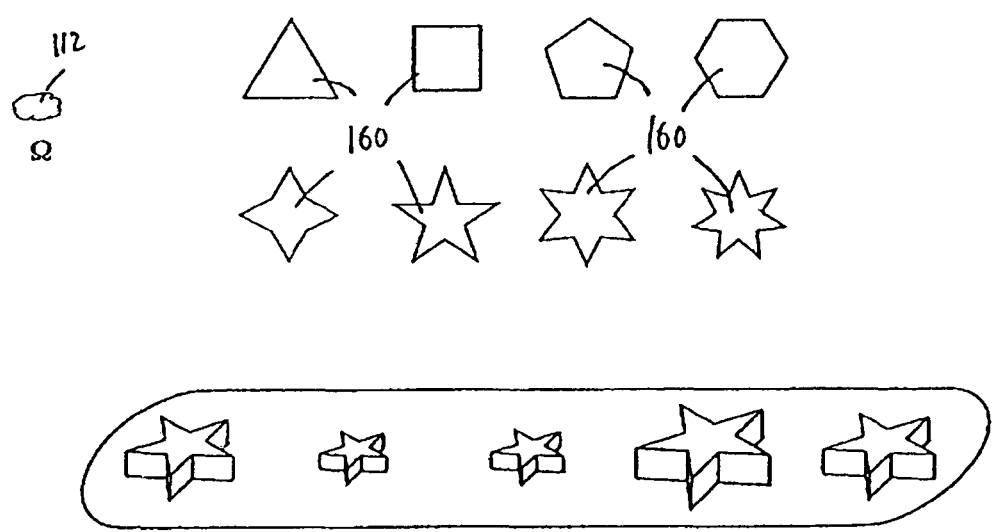
FIG. 11 is a representation of examples of manufactured sub-diffraction limit samples that may store multiplexed information that can be retrieved with a method and apparatus according to the present invention.
Figure 13A:
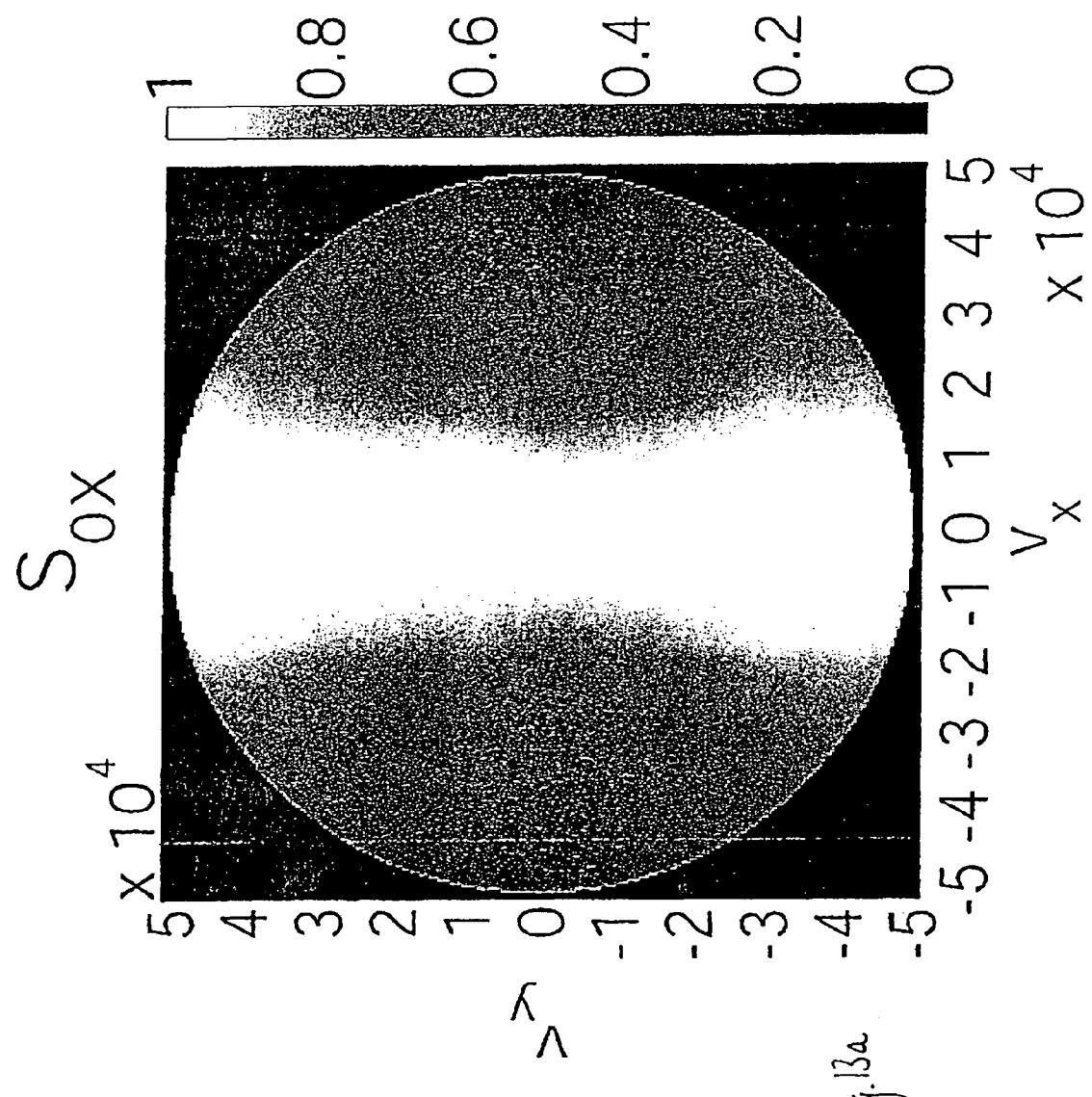
FIGS. 13a-13d show results of a simulation performed using a vectorial polarimetry apparatus according to the present invention.
Figure 13B:
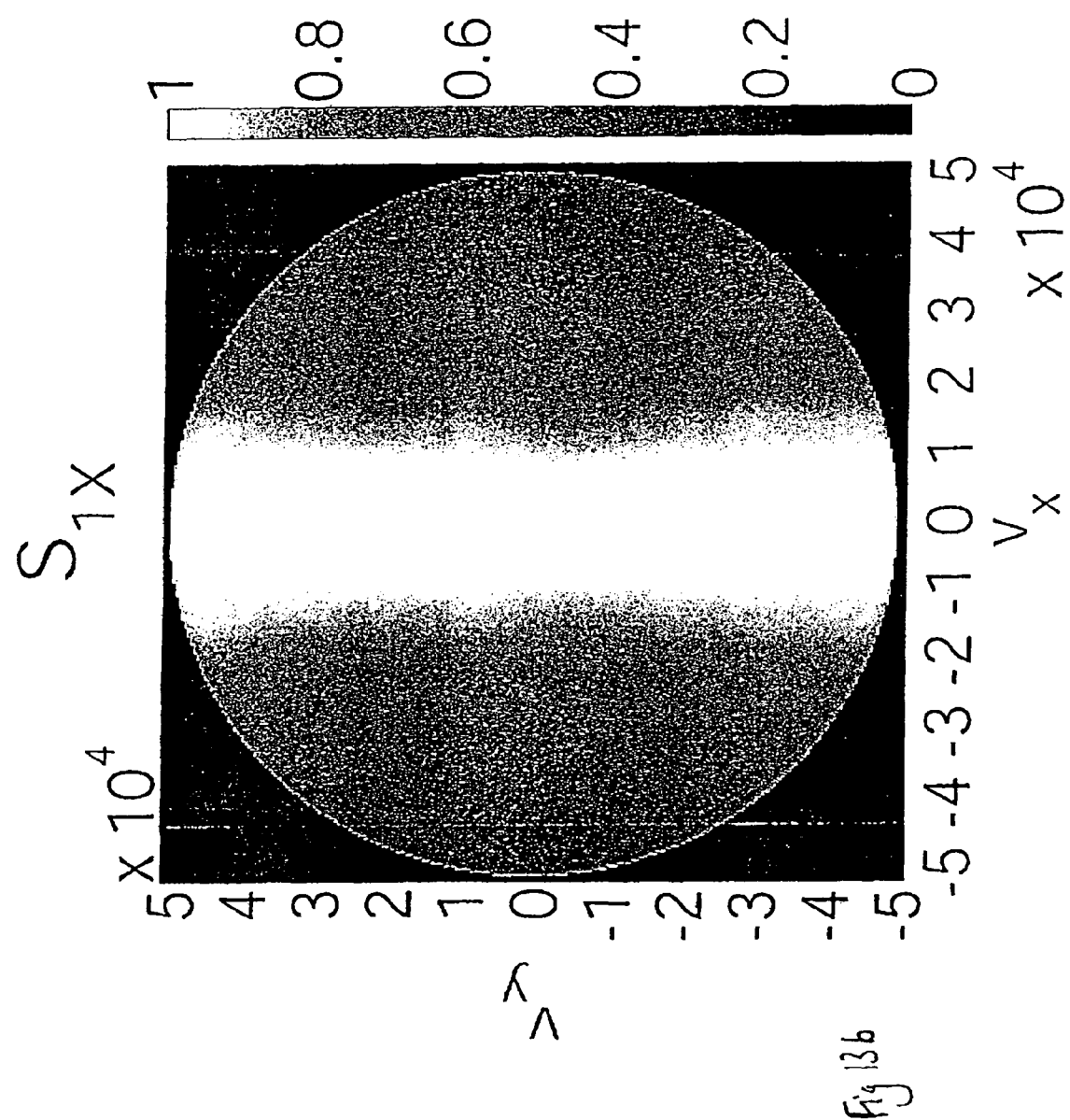
Figure 13C:
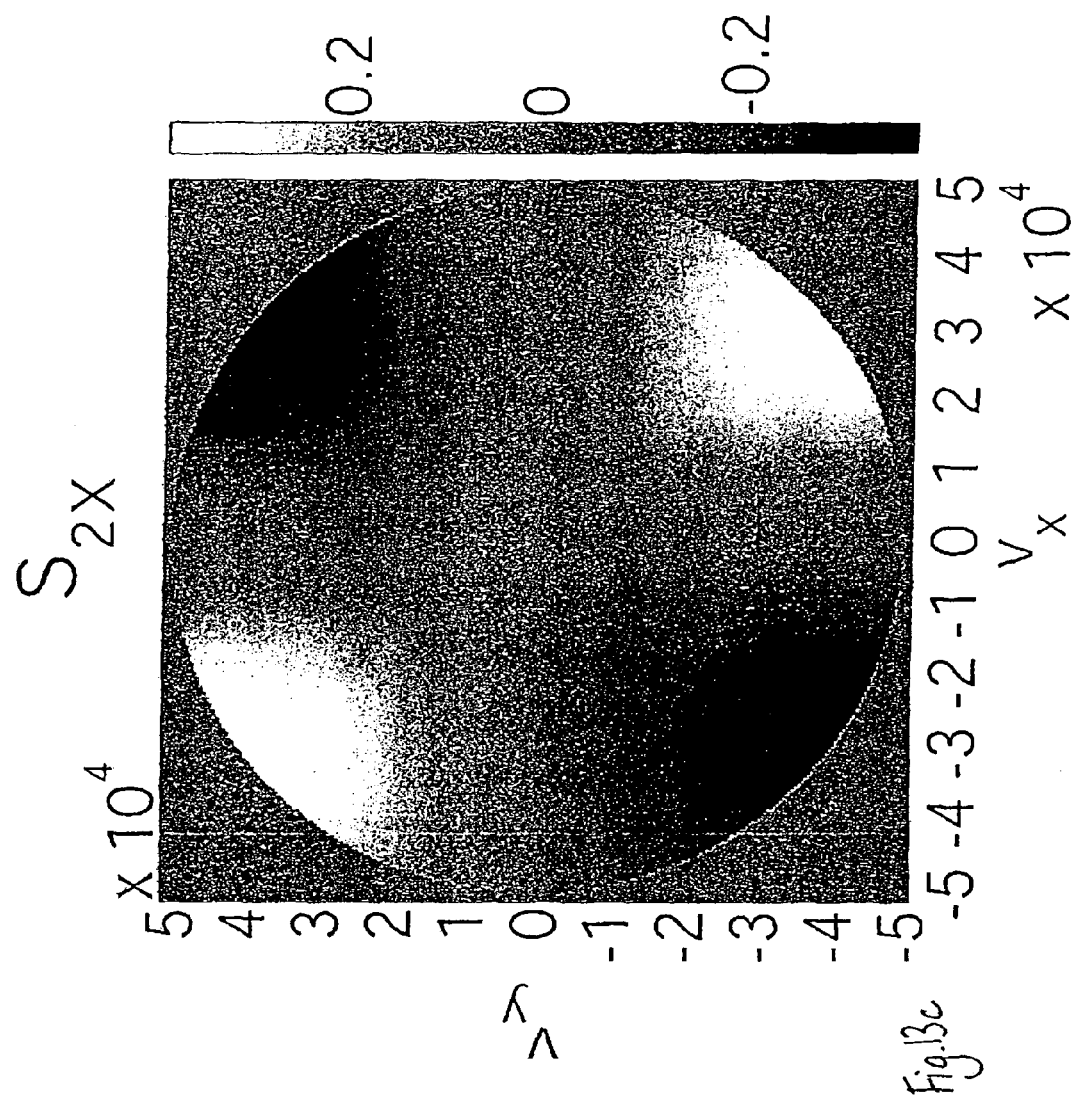
Figure 13D:
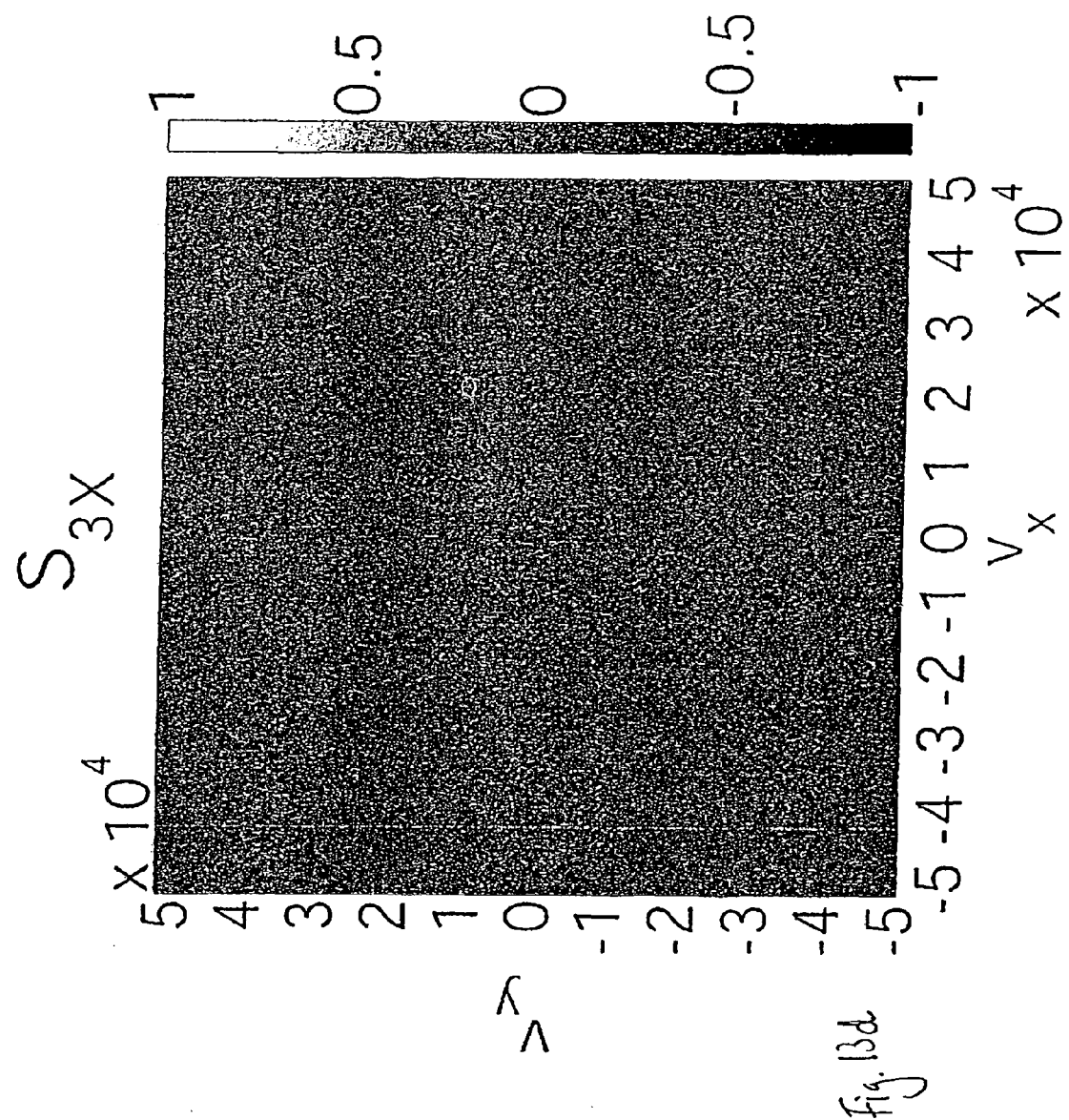
Figure 14A:
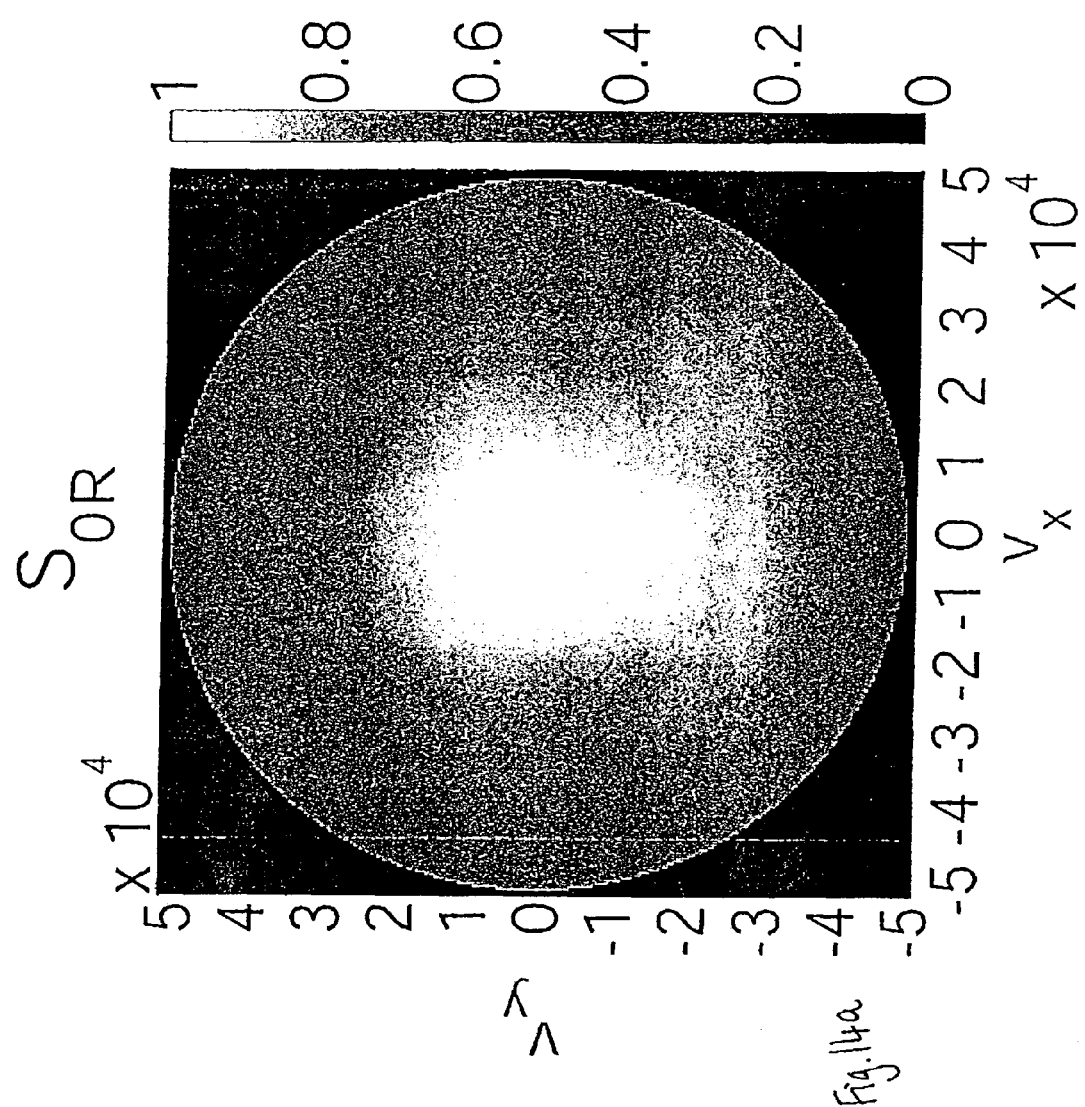
FIGS. 14a-14d show the results of a simulation performed using a vectorial polarimetry apparatus according to the present invention.
Figure 14B:
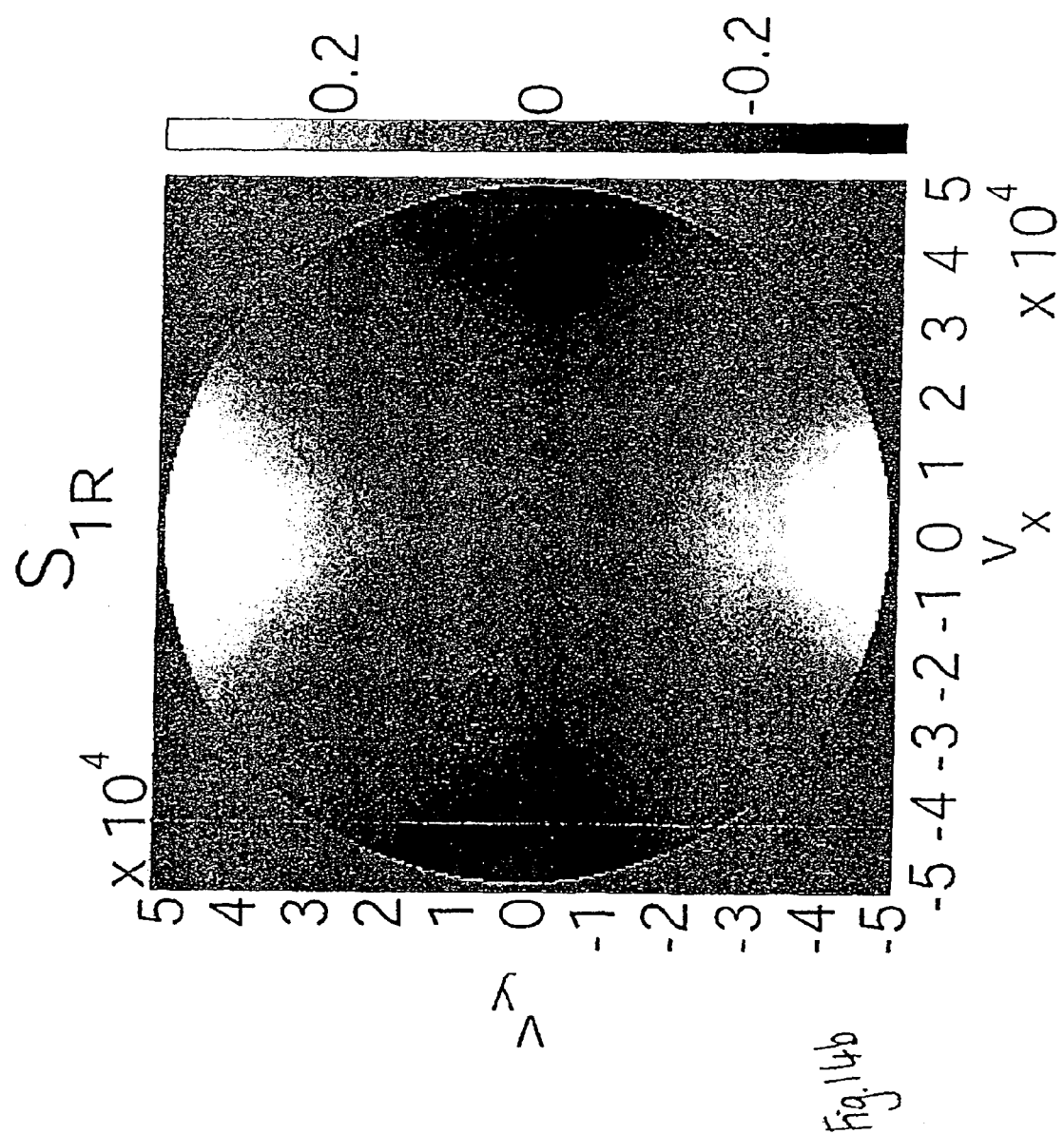
Figure 14C:
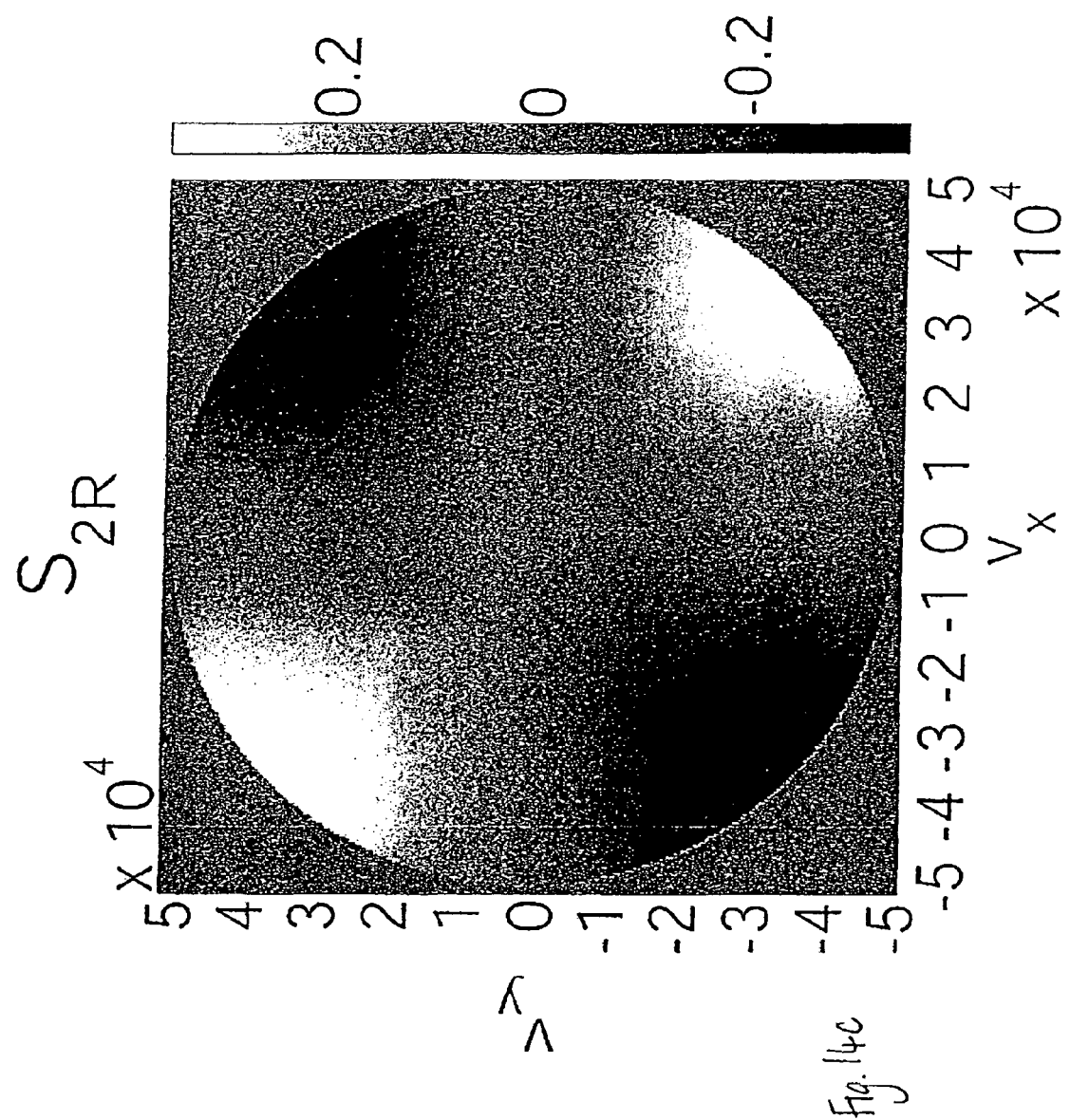
Figure 14D:
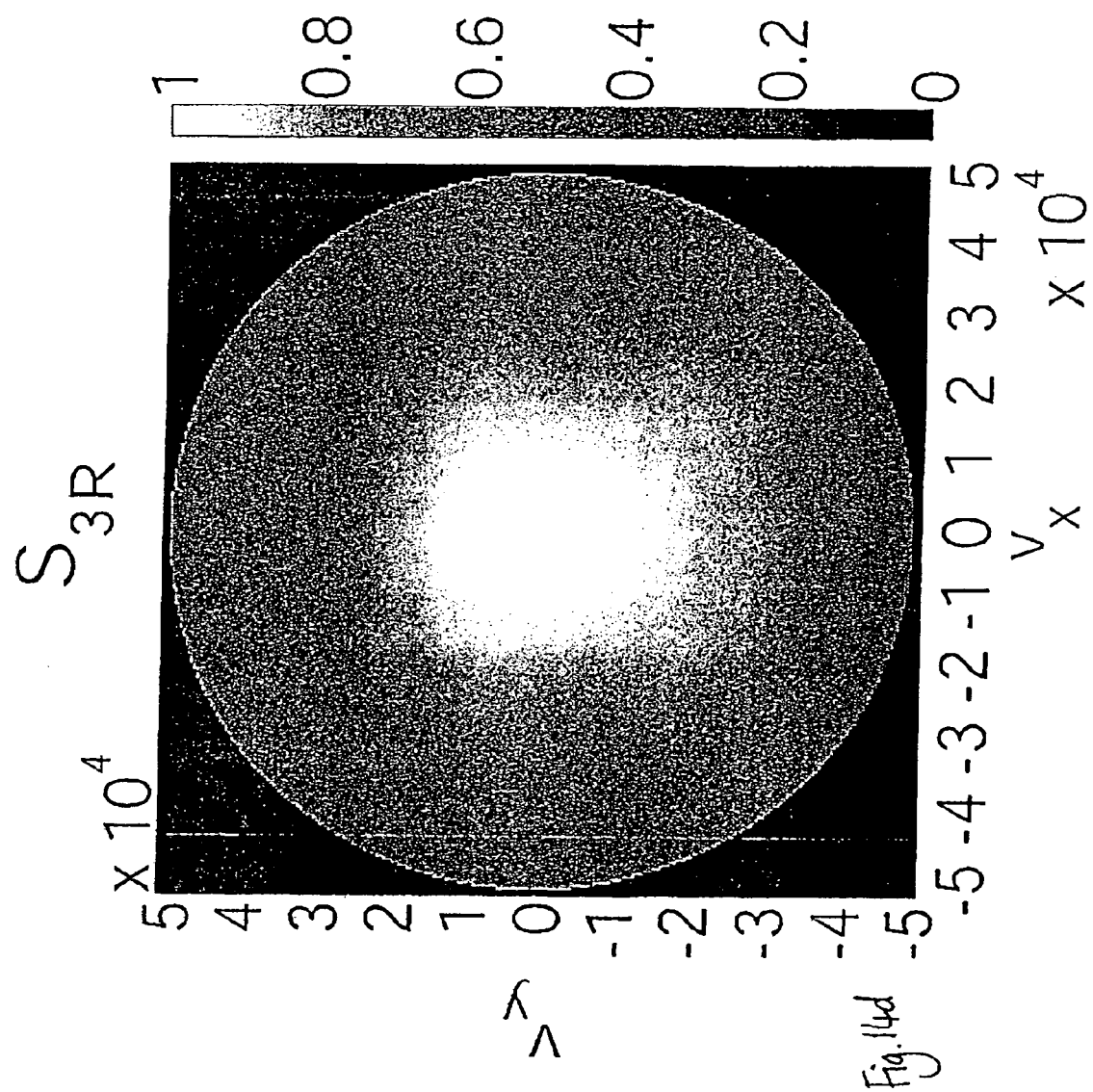

In information and data storage applications, for example, possible shapes of "pits" in the storage media that can be used to multiplex data are geometrical scatterers like, but not limited to, the examples of the sample Ω 112 shown in FIG. 11. The orientation, size, and shape, for example, of the scatterers 160 could be used to store the multiplexed information. The amount of multiplexed data will depend on the number of pixels used in the spatial polarisation state analyser, signal-to-noise-ratio, and incident distribution of the state of polarisation generated by the spatial polarisation state generator in the apparatus. The shape, size, orientation, depth, height, etc. of small manufactured samples can be used to store information, which can then be read using a method and apparatus according to the present invention. This is an example of means to store information but may not be limited to the features mentioned as long as the feature being used has an effect on the distribution of the state of polarisation across the measuring plane.

As an example, numerical results of this effect are provided which can be understood as simulated measurements. A constant distribution of the state of polarisation across the illumination beam was chosen (although this invention comprises any spatial distribution, which may not be constant): horizontal linearly polarised (along the X direction). The simulation uses a reflection scanning microscope configuration as in FIG. 12. FIG. 12 is a schematic representation of the geometry used to make the numerical calculations reported in the present application. The measurement plane $\Gamma$ collected the light scattered back by the point scatterer. Richards and Wolf method was used to calculate the EM field in the focal region $\Omega$ and then the EM field that results from the interaction of this field and a point-scatterer on the optical axis in the center of the focusing region $\Omega$ was calculated. This field will be hereinafter referred to as the scattered field.

FIGS. 13a-13d show the spatial distribution of the four Stokes parameters of the scattered field behind the aperture of the collector/objective lens. FIGS. 13a to 13d show numerical calculations of the spatial distribution of the four Stokes parameters ($S_0$, $S_1$, $S_2$, $S_3$) behind the aperture of the collector/objective lens of the field scattered by a point scatterer. The point scatterer was illuminated with a field focused with a N.A.=0.85 that started as uniformly horizontal linearly polarised before the focusing occurred. Images are normalised to unit maximum total intensity. The scale of coordinate axes $v_x$ and $v_y$ is in optical units with respect to the N.A. The measurement of the Stokes parameters can be made with any polarimetry or ellipsometry method. The scale of coordinate axes $v_x$ and $v_y$ is in optical units with respect to the N.A. of 0.85. Note that even though once the scattered light has been collected by the lens into a beam-like field again the nature of the three-dimensional EM field interaction with the sample is present as a non-homogeneous distribution of the state of polarisation across the aperture. This is the type of information retrieval that this invention is related to.

FIGS. 14a to 14d show the results of another simulation; this time uniformly distributed right-circular polarisation across the illumination beam was chosen instead of horizontal linearly polarised. The rest of the simulation parameters were chosen to be the same. It can be seen clearly, even by visual inspection only, that the two scenarios can be easily distinguished. Stokes parameters were chosen for the examples because they constitute one of the most complete measurements of polarisation, however, the invention should also include any polarisation quantity that varies across the pupil of the system as a mean to retrieve information of the interaction between the illumination and the sample. FIG. 14 shows numerical calculations of the spatial distribution of the 4 Stokes parameters ($S_0$, $S_1$, $S_2$, $S_3$) behind the aperture of the collector/objective lens of the field scattered by a point scatterer. The point scatterer was illuminated with a field focused with a N.A.=0.85 that started as uniformly right-circularly polarised before the focusing occurred. Images are normalised to unit maximum total intensity. The scale of coordinate axes $v_x$ and $v_y$ is in optical units with respect to the N.A.

There are numerous possible applications of the present invention, including but not limited to biological imaging, imaging of assembled molecular layers and structures, lithography, optical data encoding, storage and reading/retrieval, and other general imaging applications.

Examples of biological imaging areas in which the present invention may be employed include molecular imaging, cell imaging and medical imaging.

An important application of the subject invention is in the area of optical data storage. Different sub-wavelength features in a sample, which are readily available by means of micro-lithographic methods, can produce different EM field distributions on the pupil of an optical system in the domain of this invention. These patterns can be seen as signature that can be used to store information. Since it is not necessary that the structure of the sample is larger than the diffraction limited spot, this invention provides with a new way to multiplex optical data.

The application of the present invention to this field may result in the increasing of data density stored using high numerical aperture optical systems, such as those using blue and ultraviolet lasers to perform the optical storage.

Calibration of systems can be very straightforward in the light of very robust existing methods. Also, the present invention can be coupled to confocal measurements if depth discrimination within a sample are sought for. By weighting the signals measured on the pupil with the intensity collected in a confocal aperture one could acquire "confocal far-field three-dimensional optical polarimetry" measurements, or images, if the sample is scanned with the illumination spot.

The general operation of the subject invention has been described previously and someone skilled in the art could conceive specific embodiments that implement the method disclosed herein. Some examples of such embodiments are presented and some applications are described. It should be appreciated that other embodiments that make use of the method disclosed herein are also comprised by the current invention.

The invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. The invention is not limited to the embodiments hereinbefore described but may be varied in both construction and detail.

The invention claimed is:

1. A vectorial polarimetry apparatus for analyzing the three-dimensional electromagnetic field resulting from an interaction between a focused illuminating beam and a sample to be observed, by characterizing the distribution of the state of polarization of the light across a measurement plane, the apparatus comprising:
   a) a spatial polarization state generator comprising an illumination source for generating a beam of light and means to provide non-homogenous control of the state of polarization at different positions across the beam width of the beam;

b) a focusing system for bringing said illuminating light beam to a focus, wherein the focusing system has a numerical aperture greater than 0.6 so as to produce a tight focus with a three-dimensional electromagnetic field vectorial structure at the focus wherein in each and every point in space in the volume region around the focus, all three components of the electromagnetic field vector are non-zero or zero; and c) at least one spatial polarization state analyzer comprising a polarization sensitive detector adapted to measure the state of polarization of the light from the sample at different positions across the width of the measuring plane to retrieve information on the three-dimensional vectorial electromagnetic interaction of the illuminated focused field and the sample.

2. The apparatus of claim 1 further comprising:
a light splitter through which both the illuminating light beam and the reflected light from the sample pass, and for separating the illuminating light from the reflected light, wherein the light splitter comprises a least one mirror that covers only a part of the cross section of the illumination as to reflect some of the light towards the sample and let some of the light go through towards the detection arm.

3. The apparatus of claim 1 further comprising a high numerical aperture optical collector for capturing the light that has been scattered by the sample, wherein the means to control the state of polarization at different positions across the beam width of the light beam is a spatial polarization state control which is further adapted to control the state of polarization of both the illuminating and detected light.

4. The apparatus of claim 1 wherein the at least one spatial polarization state analyzer is adapted to measure the spatial distribution of the Stokes vector.

5. The apparatus of claim 1 wherein the spatial polarization state analyzer comprises means for measuring the state of polarization at different positions on the measuring plane.

6. The apparatus of claim 1 wherein the spatial polarization state analyzer comprises a polarization state analyzer and an intensity detector with spatial resolution across the width of the measuring plane, wherein the polarization state analyzer comprises sequential combinations of waveplates and polarizers that can measure the state of polarization in combination with the pixilated detector.

7. The apparatus of claim 1 wherein the apparatus comprises a plurality of polarization analyzers, each polarization analyzer taking a light intensity measurement at a different position in the measuring plane.

8. The apparatus of claim 7 wherein the multiple light intensity measurements are performed sequentially in time.

9. The apparatus of claim 7 wherein the multiple light intensity measurements are performed simultaneously by splitting the light and using more than one optical detector.

10. The apparatus of claim 1 wherein the detector comprises at least one pixilated detector for performing the intensity polarimetry measurements at different positions across the measuring surface.

11. The apparatus of claim 1 further comprising a control and processing unit, wherein the control and processing unit comprises:
means for controlling the spatial polarization state generator;
means for synchronizing the measurements of the spatial polarization state analyzer; and
means for processing the acquired data to estimate the three-dimensional vectorial field and/or characteristics of the observed sample.

12. The apparatus of claim 1 further comprising:
at least one spatial polarization state analyzer comprising a polarization sensitive detector that can measure the state of polarization of light at different positions across the width of the measurement plane;
at least one confocal polarization state analyzer comprising a polarization sensitive detector that can measure the state of polarization of light returning from different positions within the sample to retrieve information on the three-dimensional vectorial electromagnetic interaction of the illuminated focused field and the sample together with the confocal polarization sensitive image of the sample, wherein said confocal polarization state analyzer is adapted to choose measurements that return from different depths within the sample;
a first light splitter to direct reflected light from the sample to the at least one spatial polarization state analyzer; and
a second light splitter to direct reflected light from the sample to the at least one confocal polarization state analyzer.

13. The apparatus of claim 1 wherein the light source comprises a laser.

14. The apparatus of claim 1 wherein the light source comprises a laser and a spatial filter in combination with a collimator lens to expand the output of the laser to produce a resulting collimated beam.

15. The apparatus of claim 1 wherein the means to control the state of polarization at different positions across the beam width of the light beam comprises discrete polarization elements, wherein the discrete polarization elements are selected from the group comprising a pixilated spatial light modulator, continuous polarization devices, or phase and amplitude masks.

16. The apparatus of claim 1 wherein the polarization state generator can act selectively across the beam's width.

17. The apparatus of claim 1 further comprising an optical system for selecting the optical measuring plane.

18. The apparatus of claim 1 wherein the measuring plane is conjugate to the entrance pupil of the focusing system.

19. The apparatus of claim 18 wherein the optical system comprises means for optically conjugating the exit plane of the spatial polarization state control and the entrance pupil of the focusing system.

20. The apparatus of claim 18 wherein the optical system comprises means for producing an image of the same entrance pupil of the focusing system onto the detector measuring plane.

21. The apparatus of claim 1 wherein the measurement plane is an exit pupil.

22. A method for analyzing the three-dimensional electromagnetic field resulting from an interaction between a focused illuminating beam and a sample to be observed, by characterizing the distribution of the state of polarization of light across a measurement plane, the method comprising the steps of:

a) generating a beam of illuminating light;
b) controlling, in a non-homogenous manner, the state of polarization at different positions across the beam width of the light beam;
c) focusing said illuminating light beam to a focus using a focusing system having a numerical aperture greater than 0.6, wherein said focus is a tight focus, so as to ensure said focused light has a three-dimensional electromagnetic field vectorial structure at the focus, wherein in each and every point in space in the volume region around the focus, all three components of the electromagnetic field vector are non-zero or zero; and d) detecting and measuring the state of polarization of the reflected light at different positions across the width of the measurement plane to retrieve information on the three-dimensional vectorial electromagnetic interaction of the illuminated focused field and the sample.

23. The method of claim 22 further comprising the step of controlling the state of polarization of detected light.

24. The method of claim 22 further comprising the step of measuring the spatial distribution of the Stokes vector.

25. The method of claim 22 further comprising the step of measuring the state of polarization at different positions on the exit pupil.

26. The method of claim 22 further comprising the step of taking light intensity measurements at different positions in the measuring plane.

27. The method of claim 26 wherein multiple light intensity measurements are performed sequentially in time.

28. The method of claim 26 wherein multiple light intensity measurements are performed simultaneously by splitting the light and using more than one spatial detector.

29. The method of claim 22 further comprising the step of processing the acquired data to estimate the three-dimensional vectorial field and/or characteristics of the observed sample.

30. A method for analyzing the three-dimensional electromagnetic field resulting from an interaction between a focused illuminating beam and a sample to be observed, by characterizing the distribution of the state of polarization of light across a measurement plane, the method comprising the steps of:

a) generating a beam of illuminating light;

b) controlling, in a non-homogenous manner, the state of polarization at different positions across the beam width of the light beam;

c) focusing said illuminating light beam to a focus using a focusing system having a numerical aperture greater than 0.6, wherein said focus is a tight focus, so as to ensure said focused light has a three-dimensional electromagnetic field vectorial structure at the focus, wherein in each and every point in space in the volume region around the focus, all three components of the electromagnetic field vector are non-zero or zero;

d) detecting and measuring the state of polarization of the reflected light at different positions across the width of the measurement plane to retrieve information on the three-dimensional vectorial electromagnetic interaction of the illuminated focused field and the sample;

e) calculating the electromagnetic field of the illuminating light beam in the focal region;

f) calculating the electromagnetic field that results from interaction of a focused field and a point scatterer on the optical axis at the center of the focal region; and g) determining a polarization quantity that varies across the pupil of the system as a means to retrieve information on the interaction between the illuminating light and the sample.

\* \* \* \* \*